(12) United States Patent
Okada et al.

(10) Patent No.: US 8,392,679 B2
(45) Date of Patent: Mar. 5, 2013

(54) COMPUTER AND METHOD FOR CONFIGURING DATA BACKUP ENVIRONMENT USED BY PLURALITY OF ASSOCIATIVELY OPERATED APPLICATIONS

(75) Inventors: Wataru Okada, Yokohama (JP); Masayasu Asano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 958 days.

(21) Appl. No.: 12/014,134

(22) Filed: Jan. 15, 2008

(65) Prior Publication Data

US 2008/0320219 A1    Dec. 25, 2008

(30) Foreign Application Priority Data

Jun. 21, 2007    (JP) .................................. 2007-164270

(51) Int. Cl.
*G06F 12/08*    (2006.01)
(52) U.S. Cl. .................. 711/162; 711/E12.016
(58) Field of Classification Search .................... None
See application file for complete search history.

(56) References Cited

U.S. PATENT DOCUMENTS

| | | | |
|---|---|---|---|
| 7,549,027 B1 * | 6/2009 | McAndrews et al. ......... 711/161 |
| 2004/0193945 A1 | 9/2004 | Eguchi et al. | |
| 2005/0154829 A1 | 7/2005 | Maki et al. | |
| 2005/0172166 A1 | 8/2005 | Eguchi et al. | |
| 2005/0182911 A1 * | 8/2005 | Kaiser ........................... 711/170 |
| 2006/0161732 A1 * | 7/2006 | Murotani et al. .............. 711/114 |
| 2007/0214196 A1 * | 9/2007 | Garimella et al. ............. 707/204 |
| 2008/0228833 A1 * | 9/2008 | Kano ............................ 707/202 |

FOREIGN PATENT DOCUMENTS

| | | |
|---|---|---|
| JP | 2002-297427 | 10/2002 |
| JP | 2004-252686 | 9/2004 |
| JP | 2005-196618 | 7/2005 |
| JP | 2005-222110 | 8/2005 |

* cited by examiner

*Primary Examiner* — Edward Dudek, Jr.
*Assistant Examiner* — Ryan Dare
(74) *Attorney, Agent, or Firm* — Antonelli, Terry, Stout & Kraus, LLP.

(57) ABSTRACT

The present invention stores application management information indicating respective applications constituting a federated application environment, which is a group constituted by a plurality of associatively operated applications. By referencing this application management information, a plurality of applications constituting this federated application environment are specified. A plurality of first logical volumes allocated to the specified plurality of applications, and a plurality of second logical volumes constituting the backup targets for data stored in the plurality of first logical volumes, are assigned to the same volume group.

13 Claims, 18 Drawing Sheets

FIG. 5

FEDERATED AP ENVIRONMENT MANAGEMENT TABLE

| FEDERATED ID | APPLICATION ID | RECOGNIZABLE STORAGE PORT ID |
|---|---|---|
| FED_01 | DB_01 | PORT_01 |
| FED_01 | DB_02 | PORT_02 |
| FED_01 | DB_03 | PORT_03 |
| FED_02 | AP_04 | PORT_04 |
| . . . | . . . | . . . |

Columns: 5001, 5002, 5003

FIG. 6

AP/VOL CORRESPONDENCE TABLE

| APPLICATION ID | STORAGE ID | VOLUME ID | CAPACITY |
|---|---|---|---|
| AP_01 | STG_01 | VOL_01 | 10G |
| AP_01 | STG_01 | VOL_02 | 10G |
| AP_02 | STG_01 | VOL_03 | 10G |
| AP_02 | STG_01 | VOL_04 | 10G |
| . . . | . . . | . . . | . . . |

Columns: 6001, 6002, 6003, 6004

FIG. 7

BACKUP POLICY MANAGEMENT TABLE

| GROUP ID 7001 | FEDERATED ID 7002 | BACKUP FUNCTION 7003 | CASCADE-SOURCE MANAGEMENT GROUP 7004 | PRIMARY STORAGE SYSTEM ID 7005 | SECONDARY STORAGE SYSTEM ID 7006 | PROTECTION PERIOD 7007 |
|---|---|---|---|---|---|---|
| CDPG#1 | FED_01 | CDP | - | STG_01 | STG_01 | 10H |
| CTG#2 | FED_01 | REMOTE COPY | - | STG_01 | STG_02 | 0H |
| CG#3 | FED_01 | LOCAL COPY | CTG#2 | STG_02 | STG_02 | - |
| ... | ... | ... | ... | ... | ... | ... |

FIG. 8

STORAGE FUNCTIONS MANAGEMENT TABLE

| STORAGE ID | LOCAL COPY | CDP | REMOTE COPY |
|---|---|---|---|
| STG_01 | OK | OK | OK |
| STG_02 | NG | OK | NG |
| ... | ... | ... | ... |

FIG. 9

POOL VOLUME MANAGEMENT TABLE

| STORAGE ID | VOLUME ID | CAPACITY |
|---|---|---|
| STG_01 | VOL_11 | 10G |
| STG_01 | VOL_12 | 10G |
| STG_02 | VOL_13 | 10G |
| STG_02 | VOL_14 | 10G |
| ... | ... | ... |

FIG. 10

STORAGE INTERCONNECTION MANAGEMENT TABLE

| LOCAL STORAGE SYSTEM ID | REMOTE STORAGE SYSTEM ID |
|---|---|
| STG_01 | STG_02 |
| STG_02 | STG_03 |
| ... | ... |

FIG. 20

FEDERATED AP ENVIRONMENT MANAGEMENT TABLE

| FEDERATED ID | APPLICATION ID | RECOGNIZABLE STORAGE PORT ID | NETWORK ADDRESS |
|---|---|---|---|
| FED_01 | DB_01 | PORT_01 | 192.168.0.5 |
| FED_01 | DB_02 | PORT_02 | 192.168.0.6 |
| FED_01 | DB_03 | PORT_03 | 192.168.0.7 |
| FED_02 | AP_04 | PORT_04 | 192.168.0.8 |
| ... | ... | ... | ... |

FIG. 21

ASSOCIATION MANAGEMENT TABLE

| APPLICATION ID | ASSOCIATION-TARGET APPLICATION ID | NETWORK ADDRESS |
|---|---|---|
| AP_11 | DB_01 | 192.168.0.5 |
| AP_11 | DB_02 | 192.168.0.6 |
| AP_11 | DB_03 | 192.168.0.7 |
| ... | ... | ... |

COMPUTER AND METHOD FOR CONFIGURING DATA BACKUP ENVIRONMENT USED BY PLURALITY OF ASSOCIATIVELY OPERATED APPLICATIONS

CROSS-REFERENCE TO RELATED APPLICATIONS

This application relates to and claims priority from Japanese Patent Application No. 2007-164270 filed on Jun. 21, 2007, the entire disclosure of which is incorporated herein by reference.

BACKGROUND

The present invention generally relates to technology for configuring a data backup environment.

Generally speaking, in a computer system, data can be corrupted by a storage system failure or computer virus, and data can be lost due to a user operating error. In preparation for such data losses, a computer system is designed to carry out regular data backups so as to be able to restore lost data.

In Japanese Patent Laid-open No. 2005-196618, there is disclosed a technique for carrying out a batch backup of a logical volume (hereinafter, data volume) in which data used by an application is stored. Japanese Patent Laid-open No. 2005-196618 describes a storage system storing a collection of data volumes (hereinafter, a "copy group") slated to undergo a batch backup operation, the receiving of a backup indication in a copy group unit, and the backing up of data at the same point in time for all data volumes belonging to a copy group by suspending writing until the backing up of data in all data volumes belonging to this copy group is complete. When a restoration is carried out in accordance with this backup technique, the data of the respective data volumes is restored to the status of the same point in time.

Japanese Patent Laid-open No. 2004-252686 discloses a backup technique that utilizes journaling. Japanese Patent Laid-open No. 2004-252686 describes acquiring a snapshot (a logical image of a full backup or a differential backup) of a specific point in time of a logical group (hereinafter, "journal group") constituted from one or more data volumes, and storing data written to a data volume in a journal volume associated to the journal group as a journal after acquiring the snapshot, and restoring the data of all the data volumes belonging to the journal group to the status of a specific point in time by applying a series of journals to a snapshot in the order in which they were written. This is one example of a technique generally called "Continuous Data Protection" or the abbreviation thereof "CDP".

Japanese Patent Laid-open No. 2005-222110 discloses a remote backup technique for storing a journal in a remote site journal volume and carrying out data restoration at the remote site. Japanese Patent Laid-open No. 2005-222110 describes acquiring a snapshot of a journal group at a specific point in time, storing this snapshot in a remote site, and storing data written to the data volume in a remote site journal volume (a journal volume associated to the journal group) as a journal after acquiring the snapshot, and restoring the data of all the data volumes belonging to the journal group in the remote site by applying a series of journals to the snapshot in the order in which they were written. When this backup technique is used, the data of respective data volumes to be restored in the remote site are restored to the status of the same point in time.

Today, in order to make effective use of a company's management resources to enhance operational efficiency, most companies are constructing computer systems, which utilize an ERP package (Enterprise Resource Planning package) to integrate application programs (database management systems (DBMS), file systems, and so forth), which have been operated independently by each mission-critical department, to enable the respective applications to the operated associatively. For example, the various application programs (hereinafter, applications) operated by respective departments are sharing information by using the same storage system. Further, the entire computer system is carrying out processing more efficiently by enabling applications to utilize each others functions and make use of each others processing results. When applications are said to be associating here, it means that these applications are operating by using each others functions and making use of each others processing results.

When a failure occurs in a computer system in which mutually associated applications reside, the data consistency between the applications must be restored to the maintained status. That is, the various data that the respective applications are using must all be restored to the status of the same point in time.

Hereinafter, a group constituting a plurality of associatively operated applications will be called a "federated application environment". Furthermore, there may be times when a single federated application environment is constructed from a plurality of federated application environments. For example, when a first federated application environment comprises a first application, and a second federated application environment comprises a second application, which opens a prescribed interface to the first application, the first application, which uses this interface, and the second application, which provides this interface, become mutually associated. This case can be treated as a single federated application environment, which is constituted by the first federated application environment and the second federated application environment.

In a federated application environment, in order to restore data consistency between applications to the maintained status, it is necessary to associate and backup data volumes used by respective applications to the same volume group, and at restoration, to restore the respective data volumes to the status of the same point in time. However, when an application, which opens an associative interface for providing a function to another application, resides within a federated application environment, there may be times when the administrator does not know the associative relationships of all the applications. In this case, the problem is that when the administrator constructs a backup environment, which is the environment for carrying out a backup (for example, the configuration of a volume group, and what kind of backup will be carried out in this volume group), it is impossible to assign the data volumes used by all the applications inside the federated application environment to the same volume group.

This problem will be explained in detail by referring to FIG. 23. This figure shows a federated application environment, in which AP1 (applications 1) and AP2 (application 2), AP2 and AP3 (application 3), and AP3 and AP4 (application 4) are respectively associated. In the same figure, AP2 and AP3 are managed by different administrators. AP2 and AP3 are associated by way of an interface opened by either one or both of AP2 and AP3. In a case like this, the AP2 administrator cannot recognize the association between AP3 and AP4. This is because AP3 processing is a so-called black box as seen by the AP2 administrator. Similarly, the AP3 administrator cannot recognize the association between AP2 and AP1. This is because AP2 processing is a so-called black box as seen by the AP3 administrator. For the same reason, the AP1 administrator cannot recognize the association of AP3 and AP4, and the AP4 administrator cannot recognize the association of AP1 and AP2. Thus, the fact that there are four associated applications, AP1, AP2, AP3, and AP4, which belong to the federated application environment, and the fact that the data volumes used by these four AP1, AP2, AP3 and AP4 are VOL1, VOL2, VOL3 and VOL4 is not known, and therefore it is not possible to assign VOL1, VOL2, VOL3 and VOL4 to the same volume group. Thus, the backup environments of AP1, AP2, AP3 and AP4, which belong to the same federated application environment, will differ.

SUMMARY

Accordingly, an object of the present invention is to configure the same backup environment for all applications constituting the same federated application environment.

Application management information, which represents the respective applications constituting a federated application environment, which is a group constituted from a plurality of associatively operated applications, is stored. The plurality of applications constituting this federated application environment are specified by referencing this application management information. A plurality of first logical volumes, which are allocated to the specified plurality of applications, and a plurality of second logical volumes constituting the backup targets of the data stored in the plurality of first logical volumes, are assigned to the same volume group.

BRIEF DESCRIPTION OF THE DRAWINGS

FIG. 5 is a diagram showing an example of a federated AP environment management table;

FIG. 6 is a diagram showing an example of an AP/VOL correspondence table;

FIG. 7 is a diagram showing an example of a backup policy management table;

FIG. 8 is a diagram showing an example of a storage function management table;

FIG. 9 is a diagram showing an example of a pool volume management table;

FIG. 10 is a diagram showing an example of a storage interconnection management table;

FIG. 20 is a diagram showing an example of a federated AP environment management table related to the third embodiment;

FIG. 21 is a diagram sowing an example of an association management table;

DETAILED DESCRIPTION OF THE PREFERRED EMBODIMENT

Figure 1:
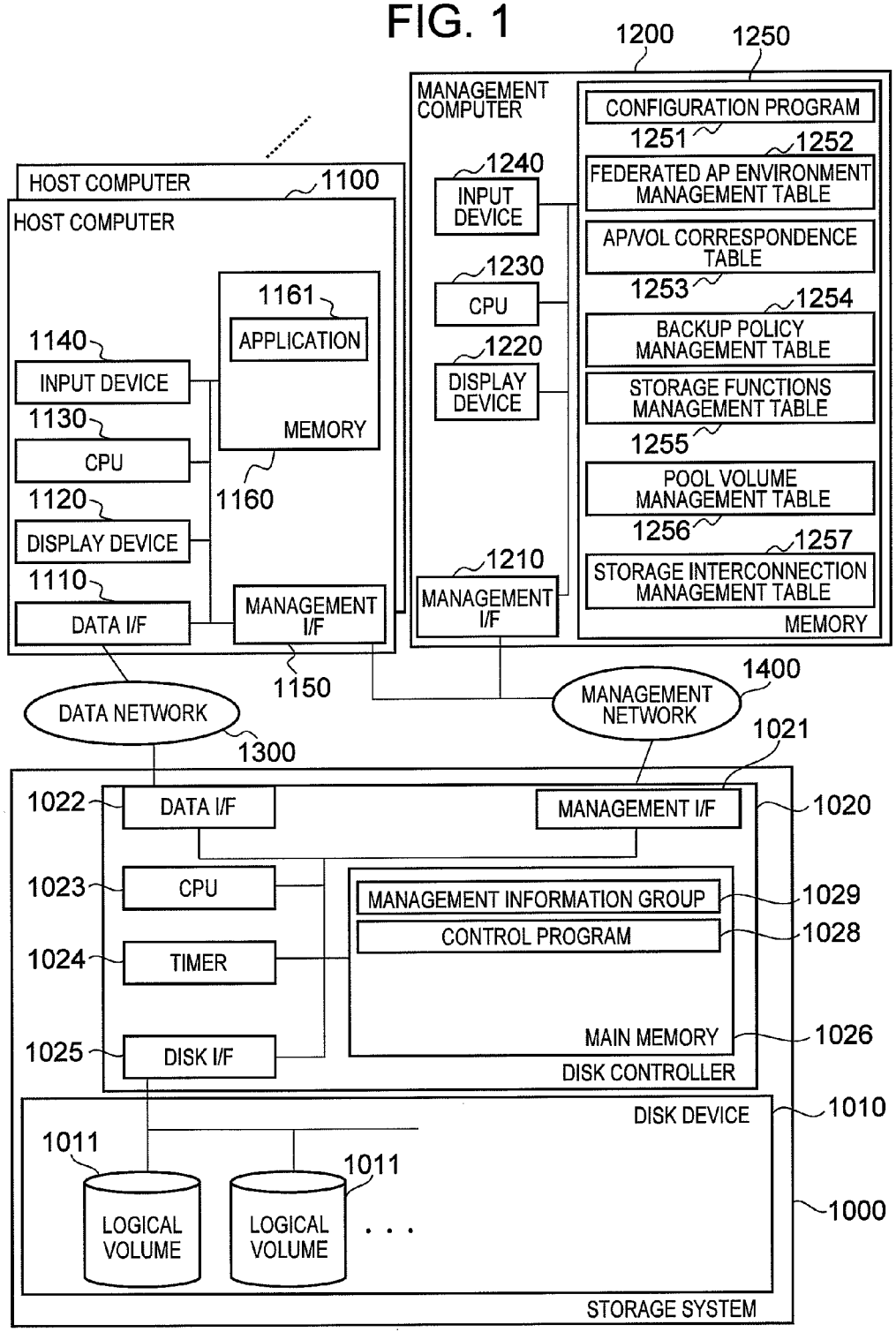
FIG. 1 is a block diagram showing an example of the constitution of a computer system related to a first embodiment.

In a first embodiment, application management information, which indicates the respective applications constituting a federated application environment, which is a group constituted by a plurality of associatively operated applications, is stored in a computer storage unit. This computer comprises a configuration unit. This configuration unit specifies the plurality of applications constituting the federated application environment by referencing the application management information. The configuration unit sends an indication for assigning to the same volume group a plurality of first logical volumes allocated to the specified plurality of applications, and a plurality of second logical volumes constituting the backup targets for data stored in the plurality of first logical volumes, to one or more storage systems comprising at least one of the plurality of first logical volumes and the plurality of second logical volumes.

The one or more storage systems, for example, comprise a control unit, which has a memory, and, for example, this memory stores volume group configuration information. The volume group configuration information, for example, indicates which of the plurality of first logical volumes and which of the plurality of second logical volumes reside in which volume group. In the storage system, which received the above-mentioned indication from the computer, the control unit updates the volume group management information such that the plurality of first logical volumes and plurality of second logical volumes specified by this indication belong to the same volume group. Consequently, the control unit can backup data stored in the plurality of first logical volumes in the plurality of second logical volumes for this same volume group based on the updated volume group configuration information.

In a first variation of the first embodiment, how data is backed up from the plurality of first logical volumes to the plurality of second logical volumes in the above-mentioned same volume group is determined on the basis of what type of backup function of a plurality of types of backup functions of the one or more storage systems, which comprise the plurality of first logical volumes and the plurality of second logical volumes, is applied to this volume group.

In a second variation of the first embodiment, the plurality of types of backup functions in the first variation comprise a function for backing up data from the plurality of first logical volumes residing in a plurality of first storage systems to the plurality of second logical volumes residing in a plurality of second storage systems. This function, for example, is the "multi spanned remote copy function" described hereinbelow.

In a third variation of the first embodiment, the storage unit also stores backup policy management information, which indicates a volume group corresponding to a federated application environment, and a backup policy for what kind of backup is to be carried out in this volume group.

In a fourth variation of the first embodiment, when a new application is added as a component of the federated application environment in the third variation, the configuration unit specifies from the backup policy management information a backup policy and a volume group corresponding to this federated application environment, creates on the basis of the above-mentioned specified backup policy an indication for adding to the specified policy group the first logical volume allocated to the new application, and the second logical volume, which constitutes the backup target for this first logical volume, and sends this indication to one or more storage systems. As used here, "creates an indication on the basis of the backup policy" refers, for example, to determining the parameters to be included in an indication (for example, the respective values of a volume identifier, backup function, and protection period, which will be explained below) based on this backup policy, and creating an indication comprising these determined parameters.

In a fifth variation of the first embodiment, when a new first logical volume is allocated to any application constituting the federated application environment in at least one of the third or fourth variations, the configuration unit specifies from the above-mentioned backup policy management information a backup policy and volume group corresponding to this federated application environment, creates on the basis of the specified backup policy an indication for adding to the above-mentioned specified volume group the above-mentioned new first logical volume and the second logical volume constituting the backup target for this first logical volume, and sends this indication to the above-mentioned one or more storage systems.

In a sixth variation of the first embodiment, when an application is removed from the federated application environment in at least one of the first embodiment and first through fifth variations, the configuration unit deletes information related to this application from the information related to the respective applications corresponding to the federated application environment in the above-mentioned application management information, and sends to the above-mentioned one or more storage systems an indication for removing the first logical volume allocated to this application to be removed, and the second logical volume constituting the backup target for the data stored in this first logical volume from the volume group to which these first and second logical volumes belong.

In a seventh variation of the first embodiment, there are a plurality of federated application environments comprising a first and a second federated application environment in at least one of the first embodiment and first through sixth variations. The storage unit also stores volume management information indicating which logical volume resides in which storage system. Application management information indicates the respective applications constituting a federated application environment for each federated application environment. When any application of the first federated application environment is associated to any application of the second federated application environment, the configuration unit determines by referencing the volume management information whether or not a plurality of first logical volumes allocated to a plurality of applications constituting the first federated application environment and a plurality of first logical volumes allocated to a plurality of applications constituting the second federated application environment reside in one storage system. If the results of the determination are negative, the configuration unit sends an indication for migrating the first logical volume residing in a storage system that is different from the above-mentioned one storage system to the above-mentioned one storage system, to at least one of the above-mentioned different storage system and the above-mentioned one storage system.

In an eighth variation of the first embodiment, the computer further comprises an association information acquisition unit in at least one of the first embodiment and first through seventh variations. The association information acquisition unit acquires association information showing the relationship of which application is associated with an application, from a host computer which executes this application, and updates the application management information using the acquired association information.

In a ninth variation of the first embodiment, when the acquired association information in the eighth variation indicates that a new application is associated with any application constituting the federated application environment, the configuration unit specifies the volume group corresponding to this federated application environment, and sends to one or more storage systems an indication for adding to the above-mentioned specified volume group the first logical volume allocated to this new application, and the second logical volume constituting the backup target of this first logical volume.

In a tenth variation of the first embodiment, when the acquired association information indicates that a new first logical volume is allocated to any application constituting the federated application environment in at least one of the eighth or ninth variations, the configuration unit specifies the volume group corresponding to this federated application environment, and sends to one or more storage systems an indication for adding to the above-mentioned specified volume group the new first logical volume, and the second logical volume constituting the backup target for this first logical volume.

In an eleventh variation of the first embodiment, when the above-mentioned acquired association information indicates that an application, which has been associated to any application of the above-mentioned federated application environment, becomes disassociated in at least one of the eighth through the tenth variations, the configuration unit deletes information related to this application from information related to the respective applications corresponding to the above-mentioned federated application environment in the application management information, and sends to one or more storage systems an indication for removing the first logical volume allocated to this application to be removed, and the second logical volume constituting the backup destination of the data stored in this first logical volume from the volume group to which these first and second logical volumes belong.

Two or more of the above-described first embodiment and first through eleventh variations can be arbitrarily combined. Further, the storage unit, for example, can be constituted from a memory and another type of storage resource. At least one of the above-described configuration unit and association information acquisition unit can be constructed from hardware, a computer program, or a combination thereof (For example, one portion can be realized via a computer program, and the remainder can be realized via hardware.). The computer program is read in and executed by a prescribed processor. Further, when the computer program has been read into the processor and information processing is being carried out, a storage residing in a memory or other such hardware resource can be used arbitrarily. Further, the computer program can be installed in the computer from a CD-ROM or other such recording medium, or it can be downloaded to the computer via a communication network.

Further, the above-mentioned computer can be constituted by being incorporated inside the storage system, or the computer and storage system can be connected by way of a communications network.

Further, the computer can be a computer which integrates a host computer, which executes a plurality of applications, and a management computer, which issues indications to the host computer, or it can be either the host computer or management computer thereof.

A number of embodiments of the present invention will be explained in detail below while referring to the figures. However, the present invention is not limited to these embodiments.

<First Embodiment>

First of all, the first embodiment will be explained. Furthermore, in the following explanation, a volume group will be called a "management group" for the sake of convenience.

A computer system related to this embodiment comprises a storage system, which has one or more backup functions from among a local copy function, a CDP function, and a remote copy function. The local copy function is for carrying out a data copy between data volumes inside one storage system. The CDP function is for carrying out a backup utilizing CDP. The remote copy function is for copying data stored in the data volume inside a storage system to a data volume inside a different storage system.

Further, this computer system comprises a plurality of applications. Then, one or more applications open interfaces for providing their own functions. Other applications can use these interfaces, and utilize the prescribed functions of the applications, which opened these interfaces. Thus, a federated application environment is constructed in this computer system by applications associating with one another by using the opened interfaces.

Hereinafter, an application, which opens an interface for providing its own function, may be called an "association-target application", and an application, which utilizes this interface, may be called an "association-source application". Further, a federated application environment to which an association-target application belongs may be called an "association-target federated application environment", and a federated application environment to which an association-source application belongs may be called an "association-source federated application environment".

The system configuration and operation of this embodiment will be explained below.

(1-1) System Configuration of First Embodiment

FIG. 1 is a block diagram showing an example of the constitution of a computer system related to this embodiment.

In this system, a storage system 1000 and one or more host computers 1100 are interconnected via a data network 1300. In this embodiment, the data network 1300 is a storage area network (SAN), but it can be an IP network or another data communication network.

The storage system 1000, host computer 1100 and a management computer 1200 are interconnected via a management network 1400. In this embodiment, the management network 1400 is an IP network, but it can be a storage area network or another data communication network. Further, the data network 1300 and the management network 1400 can be the same network, and the host computer 1100 and management computer 1200 can be the same computer.

Furthermore, for convenience of explanation, there is one storage system 1000 and one management computer 1200 in FIG. 1, but two or more of each can be installed.

The storage system 1000 comprises a disk device 1010 for storing data, and a disk controller 1020 for exercising control inside the storage system 1000.

The disk device 1010 is a disk-type storage device, for example, a hard disk drive. A wide variety of storage devices, such as flash memory device, can be used instead of the disk device 1010. A plurality of logical volumes 1011 are created based on the storage space of the disk device 1010. The logical volumes 1011 are used differently in each backup function. To clarify the explanations, in this embodiment, the names of the logical volumes will change according to their intended uses in the respective backup functions. For example, when used to store data utilized by an application, a logical volume 1011 will be called a "data volume", and when used to store a snapshot, a logical volume 1011 will be called a "snapshot volume", and so forth. The intended uses and names of such logical volumes 1011 will be explained using FIGS. 2, 3 and 4.

The disk controller 1020 comprises a management I/F 1021, a data IF 1022, a disk IF 1025, a main memory 1026, a CPU 1023, and a timer 1024.

The main memory 1026 stores a management information group 1029, and a control program 1028. The CPU 1023 executes a program stored in the main memory 1026. Hereinbelow, when a computer program is the subject, the processing is actually carried out by the CPU, which executes this computer program.

The control program 1028, upon being executed by the CPU 1023, executes a variety of processes for realizing one or more functions from among the local copy function, CDP function, and remote copy function. For example, the control program 1028 comprises a local copy program for realizing the local copy function, a CDP program for realizing the CDP function, and a remote copy program for realizing the remote copy function.

Further, the control program 1028 processes the input/output of data to/from the disk device 1010, and configures configuration information and control information inside the storage system 1000 in response to a request from the management computer 1200 or the host computer 1100. The configuration information, for example, comprises information indicating a logical volume type (usage), such as which logical volume 1011 is a data volume, and information indicating the relationships between volumes, such as either the journal group to which a data volume belongs, or which backup volume is associated with which data volume. The configuration information is stored in the main memory 1028 as either all or a part of a management information group 1029. The control program 1028 can execute the above-mentioned variety of processes while either referring to or updating the configuration information comprised in the management information group 1029.

The timer 1024 is an ordinary timer for managing the current time. The control program 1028 can obtain the time when a journal was created, or a snapshot was acquired by referencing the timer 1024.

The data IF 1022 is the interface for the data network 1300. The data IF 1022 has one or more communication ports. The disk controller 1020 sends and receives data or control commands to the host computer 1100 or another storage system 1000 via this port.

The management IF 1021 is the interface with the management network 1400. The management IF 1021 sends and receives data and control commands to and from the host computer 1100 and the management computer 1200.

The disk IF 1025 is the interface to the disk device 1010. The disk IF 1025 sends and receives data and control commands to and from the disk device 1010.

The host computer 1100 comprises a keyboard, mouse or other such input device 1140, a CPU 1130, a CRT or other such display device 1120, a memory 1160, a data I/F 1110, and a management IF 1150.

The data IF 1110 is the interface to the data network 1300. The data IF 1110 has one or more communication ports. The host computer 1100 sends and receives data and control commands to and from the storage system 1000 via this port.

The management IF 1150 is the interface to the management network 1400. The management IF 1150 sends and receives data and control commands to and from the management computer 1200 and storage system 1000 for system management purposes.

The memory 1160 stores an application 1161. The CPU 1130 realizes various functions by executing a program stored in the memory 1160.

The application 1161 is an application program that uses a data volume, which is on type of logical volume 1011, and, for example, is a DBMS or file system. The application 1161 belongs to a federated application environment, and associatively operates with another application inside this host computer 1100 or another host computer 1100.

The management computer 1200 comprises a keyboard, mouse or other such input device 1240, a CPU 1230, a CRT or other such display device 1220, a memory 1250, and a management IF 1210.

The management IF 1210 sends and receives data and control commands to and from the host computer 1100 and storage system 1000 for system management purposes.

The memory 1250 stores a configuration program 1251, a federated AP environment management table 1252, an AP/VOL correspondence table 1253, a backup policy management table 1254, a storage function management table 1255, a pool volume management table 1256, and a storage interconnection management table 1257.

The configuration program 1251 is for configuring backup environment information, which the storage system 1000 uses to realize various types of backup functions. Configured backup environment information is recorded in the main memory 1026 of the storage system 1000 as either all or a part of the management information group 1029. Further, the configuration program 1251 configures the information in the various tables 1252 through 1257. The configuration program 1251, for example, provides a CLI (Command Line Interface) or the like as the interface for enabling the administrator to configure this information.

The CPU 1230 realizes various functions, which will be explained hereinbelow, by executing the configuration program 1251.

Details concerning the federated AP environment management table 1252, AP/VOL correspondence table 1253, backup policy management table 1254, storage function management table 1255, pool volume management table 1256, and storage interconnection management table 1257 will be explained below.

Figure 2:
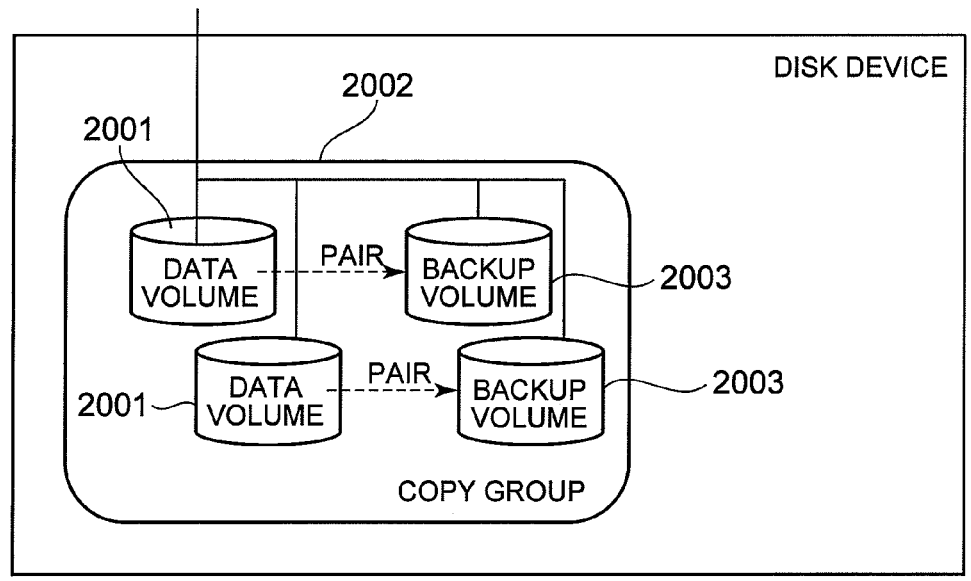
FIG. 2 is a diagram showing an example of the constitution of a management group for realizing a local copy function.
Figure 3:
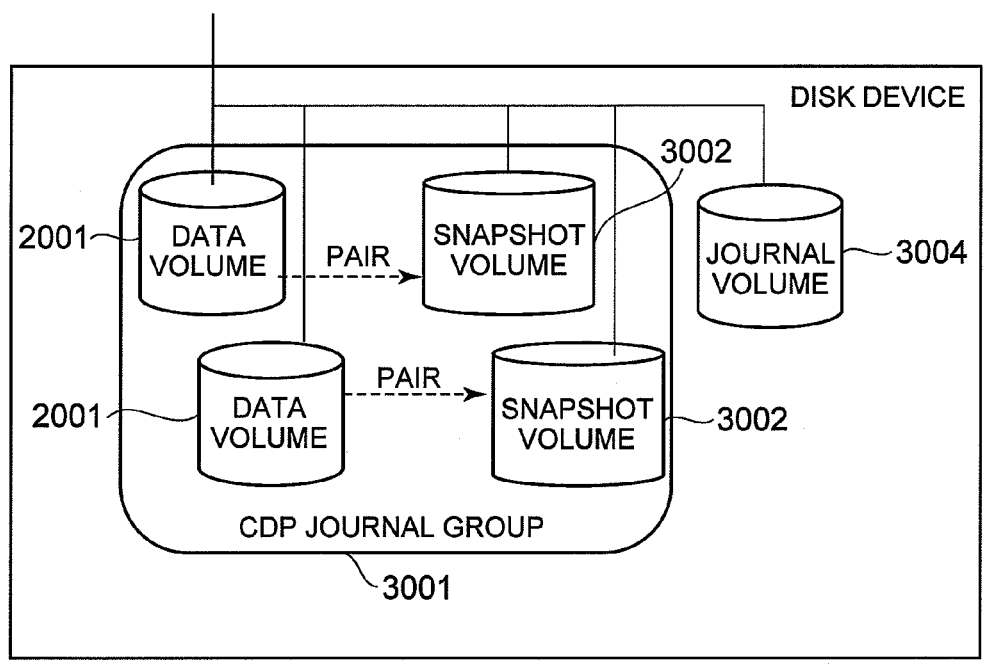
FIG. 3 is a diagram showing an example of the constitution of a management group for realizing a CDP function.
Figure 4:
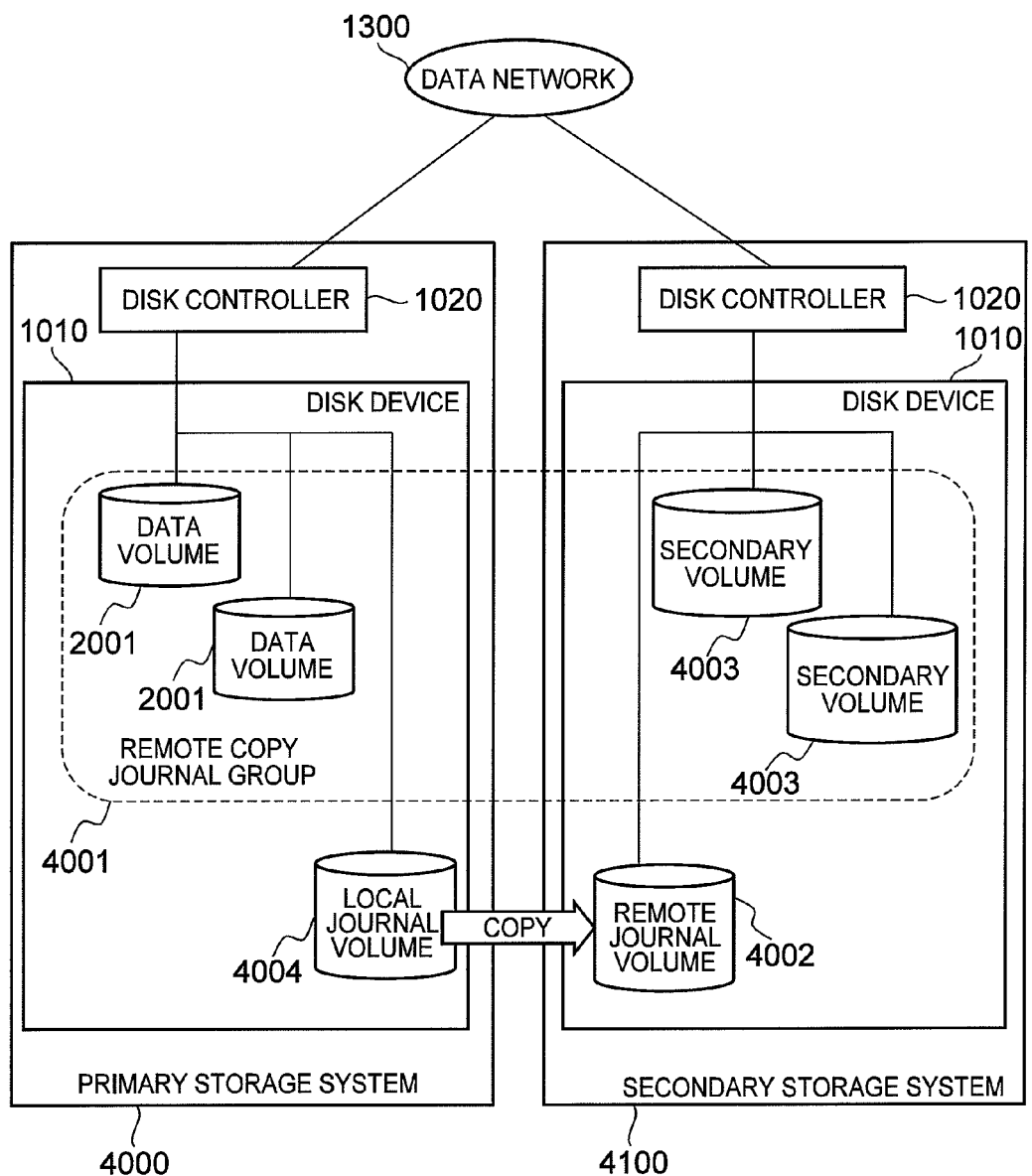
FIG. 4 is a diagram showing an example of the constitution of a management group for realizing a remote copy function.

FIGS. 2 through 4 are diagrams showing examples of the constitution of a management group for each backup function. The intended uses and names of the logical volumes 1011 for each backup function will be explained by referring to these figures.

FIG. 2 is a diagram showing an example of the constitution of a management group for realizing a local copy function. Furthermore, this figure shows the inside of the disk device 1010, but otherwise the configuration is the same as in FIG. 1.

A data volume 2001 is a logical volume 1011, which stores data used by the host computer 1100. Further, a backup volume 2003 is a logical volume 1011 associated to a data volume 2001, and stores a snapshot of the associated data volume 2001 at a specified point in time. Hereinafter, the volume pair of such a data volume 2001 and backup volume 2003 will be called a "local copy pair". A copy group 2002 logically groups a plurality of local copy pairs.

The configuration information related to these logical volumes 1011 (for example, information indicating which logical volumes form local copy pairs, and which local copy pairs constitute components of which copy groups) is managed by the control program 1028 as one piece of information comprising the management information group 1029.

The specific storage system 1000 processing for realizing a local copy function is as follows. That is, the control program 1028 of the storage system 1000, in accordance with an administrator backup indication, backs up the data of a data volume 2001 belonging to the copy group 2002 to the backup volume 2003 paired with this data volume 2001. The control program 1028 can suspend writing to the data volume 2001 at this time until the backup is complete. Or, the control program 1028, in accordance with a backup indication from the administrator, can copy the data of the data volume 2001 to the backup volume 2003 in blocks, and can manage information as to the completion or incompletion of copying in blocks. Then, when a write is generated to the data volume 2001 at a timing other than backup indication receipt, the control program 1028 can also reference the copy complete or incomplete information for each managed block, and if block copying to the write target is incomplete, can first copy the data of this area to the backup volume 2003, and thereafter execute the write to the data volume. Consequently, a backup of all data volumes 2001 inside a copy group 2002 is created at the same point in time.

FIG. 3 is a diagram showing an example of the constitution of a management group for realizing a CDP function. Similar to FIG. 2, this figure also shows the inside of the disk device 1010, but otherwise the constitution is the same as in FIG. 1.

The data volume 2001 is the same as the data volume disclosed in FIG. 2. Further, a snapshot volume 3002 is a logical volume 1011, which is associated to the data volume 2001, and stores a snapshot of the associated data volume 2001 at a specified point in time. Hereinafter, the volume pair of such a data volume 2001 and snapshot volume 3002 will be called a "CDP pair". A CDP journal group 3001 logically groups a plurality of CDP pairs.

One or more journal volumes 3004 are associated to the CDP journal group 3001. A journal volume 3004 is a logical volume 1011 for storing a journal.

The configuration information related to these logical volumes 1011 (for example, information indicating which logical volumes form CDP pairs, and which CDP pairs constitute components of which CDP journal groups) is managed by the control program 1028 as one piece of information comprising the management information group 1029, the same as in the case of FIG. 2.

The specific storage system 1000 processing for realizing a CDP function is as follows. That is, the control program 1028 of the storage system 1000, in accordance with a CDP function startup indication from the administrator, acquires a snapshot of a data volume 2001 belonging to the CDP journal group 3001, and stores the acquired snapshot in the snapshot volume 3002 constituting a CDP pair with this data volume 2001. Then, the control program 1028 stores a subsequent write to the data volume 2001 as a journal in the journal volume 3004 associated to the CDP journal group 3001 to which this data volume 2001 belongs. The control program 1028 manages the journal at this time by associating it with the write order. At restoration time, the control program 1028 restores the data of all the data volumes 2001 belonging to the CDP journal group 3001 to the status of the same arbitrary point in time by applying a series of journals to the snapshot in accordance with the write order.

Furthermore, in the explanation referring to FIG. 3, written data is treated as a journal, but instead of that, data can be treated as a journal prior to being written. In this case, the control program 1028 restores the data of all the data volumes 2001 belonging to the CDP journal group 3001 to the status of the same arbitrary point in time by writing a journal to the data volume 2001.

FIG. 4 is a diagram showing an example of the constitution of a management group for realizing a remote copy function. This figure omits the host computer 1100 and management computer 1200, but these are the same as in FIG. 1. Further, the inside of the disk controller 1020 is also the same as in FIG. 1.

Because the intended uses and names of the logical volumes 1011 in this configuration are practically the same as in FIG. 3, only the differences will be explained. This configuration comprises a pair of storage systems 1000 (the one will be called a "primary storage system 4000", and the other will be called a "secondary storage system 4100" (may also simply be called "primary" and "secondary")). The disk controller 1020 of the primary storage system 4000, and the disk controller 1020 of the secondary storage system 4100 are connected via the data network 1300, and the control programs 1028 of both storage systems 4000, 4100 are capable of mutually exchanging data and control commands. Such connection information is also managed by the control program 1028 as information comprised in the management information group 1029.

The primary storage system 4000 has a data volume 2001 and a local journal volume 4004. The secondary storage system 4100 has a secondary volume 4003 and a remote journal volume 4002.

The data volume 2001 is the same as the data volume disclosed in FIG. 2. Further, the secondary volume 4003 is a logical volume 1011, which is associated to the data volume 2001, and stores a snapshot of the associated data volume 2001 at a specified point in time. Hereinafter, a volume pair of such a data volume 2001 and secondary volume 4003 will be called a "remote copy pair". The remote copy journal group 4001 logically groups a plurality of remote copy pairs.

One or more local journal volumes 4004 and one or more remote journal volumes 4002 are associated to the remote copy journal group 4001. The local journal volume 4004 is a logical volume 1011, which stores a write to the data volume 2001 as a journal. The remote journal volume 4002 is a logical volume 1011, which temporarily stores a journal transferred from the primary side.

The configuration information related to these logical volumes (for example, information indicating which logical volumes form remote copy pairs, and which remote copy pairs constitute components of which remote copy journal groups) is managed by the control program 1028 as one piece of information comprised in the management information group 1029, the same as in the cases of FIGS. 2 and 3.

The specific storage system 1000 processing for realizing the remote copy function is as follows. That is, when the administrator issues a remote copy startup indication to the control program 1028 of the primary storage system 4000, the control program 1028 of the primary storage system 4000 and the control program 1028 of the secondary storage system 4100, while exchanging control information and data, acquire a snapshot of the data volume 2001 belonging to the remote copy journal group 4001, and store the acquired snapshot in the secondary volume 4003 constituting the remote copy pair with this data volume 2001. Then, the control program 1028 of the primary storage system 4000 stores a subsequent write to the data volume 2001 as a journal in the local journal volume 4004 associated to the journal group 4001 to which this data volume 2001 belongs in accordance with the write order. Then, the control program 1028 of the primary storage system 4000 sends the journal stored in the local journal volume 4004 to the secondary storage system 4100 via the data network 1300 in accordance with the write order. The control program 1028 of the secondary storage system 4100 stores the received journal in the remote journal volume 4002 associated to this remote copy journal group 4001 in accordance with the write order. Then, the control program 1028 of the secondary storage system 4100, in response to an indication from the administrator or as a specified timing, applies the journal stored in the remote journal volume 4002 to the secondary volume 4003 in accordance with the write order. Consequently, data of the same point in time in all the data volumes 2001 belonging to the remote copy journal group 4001 is restored to the secondary volume 4003.

Furthermore, the local journal volume 4004 can be created by allocating a temporary data storage area (for example, a cache) in the main memory 1026 of the primary storage system 4000. Similarly, the remote journal volume 4002 can be created by allocating a temporary data storage area (for example, a cache) in the main memory 1026 of the secondary storage system 4100.

Furthermore, in the explanation that refers to FIG. 4, the control program 1028 of the primary storage system 4000 drives the process, and transfers data to the secondary storage system 4100, but the constitution can be such that the control program 1028 of the secondary storage system 4100 drives the process, and issues a data transfer command to the control program 1028 of the primary storage system 4000.

Further, besides being applied to a backup, a configuration that utilizes this remote copy function can also be used to create a reserve site for disaster recovery.

The preceding is an explanation of the intended uses and names of the logical volumes 1011 for each backup function. As is clear from the above explanation, a volume pair comprising a logical volume 1011, which is a backup source (a data volume 2001) and a logical volume 1011, which stores a snapshot (a backup volume 2003, snapshot volume 3002 or secondary volume 4003) is constituted as the commonality of the configurations for realizing the respective backup functions. Hereinafter, the various types of volume pairs may simply be called "pairs". Then, a backup source logical volume 1011 may be called a "primary VOL" and a logical volume 1011 for storing a snapshot may be called a "secondary VOL".

Further, as another commonality, pairs are treated as groupings for all the backup functions. Hereinafter, these groups (copy group, CDP journal group, remote copy journal group) will be referred to generically as a "management group".

In a computer system according to this embodiment, it is also possible to combine a plurality of either the same types or different types of backup functions. For example, in a configuration in which the data in a data volume 2001 is backed up to a backup volume 2003 using a local copy function, the data in this backup volume 2003 can also be backed up using an arbitrary backup function. Therefore, there can also be cases in which a logical volume 1011 capable of becoming a primary VOL is not limited to a data volume 2001, but rather can be a secondary VOL in the respective backup functions. Hereinafter, a configuration for also backing up the secondary VOL data of a pair belonging to a certain management group will be called a "cascade configuration" Then, the management group to which this secondary VOL belongs as a snapshot storage-target volume will be called a "cascade-source management group", and the management group to which this secondary VOL belongs as a backup-source volume will be called a "cascade-target management group".

Further, for any backup function, a plurality of pairs can be formed with respect to a primary VOL. For example, a single data volume 2001 can be paired with a plurality of backup volumes 2003.

FIG. 5 is a diagram showing an example of a federated AP environment management table 1252.

This table 1252 records information related to the configuration of a federated application environment (information indicating which applications 1161 are associated with one another) for each federated application environment. Referring to a certain federated application environment (hereinafter, called "target federated application environment" in FIG. 5), a federated ID 5001 is the identifier of a target federated application environment. An application ID 5002 is the identifier of an application 1161, which belongs to the target federated application environment. A recognizable storage port ID 5003 is the identifier for the data I/F 1022 of the storage system 1000 capable of being recognized by the host computer 1100 running the application 1161 identified by the application ID 5002 corresponding to the target federated application environment. A plurality of values can be configured as the recognizable storage port ID 5003 for a single application 1161.

The corresponding relationships of the respective information elements in this table 1252 are configured by a user using the CLI provided by the configuration program 1251.

FIG. 6 is a diagram showing an example of an AP/VOL correspondence table 1253.

This table 1253 manages information related to data volumes 2001 utilized by the respective applications 1161. An application ID 6001 is the identifier for an application 1161. A storage ID 6002 is the identifier for a storage system 1000, which stores the data volume 2001 utilized by the application 1161 identified by the application ID 6001. A volume ID 6003 is the identifier for the data volume 2001 utilized by the application 1161 identified by the application ID 6001. Capacity 6004 is the capacity of the data volume 2001 identified by the volume ID 6003.

The corresponding relationships of the respective information elements in this table 1253 are configured by a user using CLI, which is provided by the configuration program 1251. The flow of this configuration will be explained below.

FIG. 7 is a diagram showing an example of the backup policy management table 1254.

This table 1254 records information related to the federated application environment corresponding to a target management group, and information related to the backup policy corresponding to a target management group for each management group. Referring to a certain management group (hereinafter, called the "target management group" in the explanation of FIG. 7), a group ID 7001 is the identifier for the target management group. A federated ID 7002 is the identifier for the federated application environment corresponding to the target management group. Backup function 7003 is information indicating the type of the backup function of the target management group (that is, local copy function, CDP function, or remote copy function). In this figure, "local copy" denotes the local copy function, "CDP" denotes the CDP function, and "remote copy" denotes the remote copy function, respectively. Cascade-source management group 7004 is information indicating whether or not the target management group constitutes a cascade-target management group. When any management group identifier is recorded as the cascade-source management group 7004, it is understood that the target management group is the cascade-target management group, and the management group denoted by the cascade-source management group 7004 is the cascade-source management group. When a management group identifier is not recorded as the cascade-source management group 7004 (where "–" is recorded in the figure), this shows that the target management group is not the cascade-target management group. A primary storage system ID 7005 is the identifier for a storage system 1000 comprising a primary VOL. A secondary storage system ID 7006 is the identifier for a storage system 1000 comprising a secondary VOL. Protection period 7007 is the target value for a time, which is traced back from the present at restoration when a CDP function or remote copy function is used as the backup function. For example, "10H" is configured when the desire is to trace back 10 hours. Conversely, when a backup function is not intended for backup use, but rather is used to create a reserve site during a disaster recovery, for example, "0H" is configured. Furthermore, when the backup function 7003 is the local copy function, for example, "–" is configured for this value.

In this embodiment, the backup environment is defined by combining a management group configuration and a backup policy. The backup policy is the backup to be executed for this management group, and comprises at least the type of backup to be executed. In addition, the backup policy can also comprise the data protection period and so forth.

The corresponding relationships of the respective information elements in this table 1254 are configured by a user using a user interface (for example, CLI) provided by the configuration program 1251. The flow of this configuration will be explained below.

FIG. 8 is a diagram showing an example of a storage function management table 1255.

This table 1255 records which backup functions exist for each storage system. Referring to a certain storage system (hereinafter, called the "target storage system" in the explanation of FIG. 8), a storage ID 8001 is the identifier for the target storage system. Local copy 8002 is information indicating whether or not the target storage system 1000 comprises the local copy function. CDP 8003 is information indicating whether or not the target storage system 1000 comprises the CDP function. Remote copy 8004 is information indicating whether or not the target storage system 1000 comprises the remote copy function. When the storage system 1000 comprises the respective backup functions, the value in the local copy 8002, CDP 8003, and remote copy 8004, respectively, is "OK", and when the storage system 1000 does not comprise these backup functions, the value is "NG".

The respective information elements in this table 1255 are configured by a user using a user interface (for example, CLI) provided by the configuration program 1251. Instead of this, the configuration program 1251 can also acquire the respective information elements from the control program 1028, and configure same in this table 1255.

FIG. 9 is a diagram showing an example of the pool volume management table 1256.

This table 1256 stores information related to an unused logical volume 1011. Referring to a certain unused logical volume 1011 (hereinafter, called a "target unused volume" in the explanation of FIG. 9), a storage ID 9001 is the identifier for the storage system 1000 comprising the target unused volume 1011. A volume ID 9002 is the identifier for the target unused volume 1011. Capacity 9003 is the storage capacity of the target unused volume 1011.

The respective information elements in this table 1256 are configured by a user using a user interface (for example, CLI) provided by the configuration program 1251.

FIG. 10 is a diagram showing an example of the storage interconnection management table 1257.

This table 1257 records information indicating the connection relationships between storage systems 1000. The one of the two storage systems 1000 for which a connection relationship is depicted in this table 1257 becomes the initiator (data transfer source) and the other becomes the target (data transfer target), and the initiator and target can transfer data to one another. That is, a local storage system ID 10001 is the identifier for the storage system 1000 constituting the initiator, and a remote storage system ID 10003 is the identifier of the target storage system 1000.

The respective information elements in this table 1257 are configured by a user using a user interface (for example, CLI) provided by the configuration program 1251.

(1-2) Processing Carried Out by First Embodiment

Figure 11:
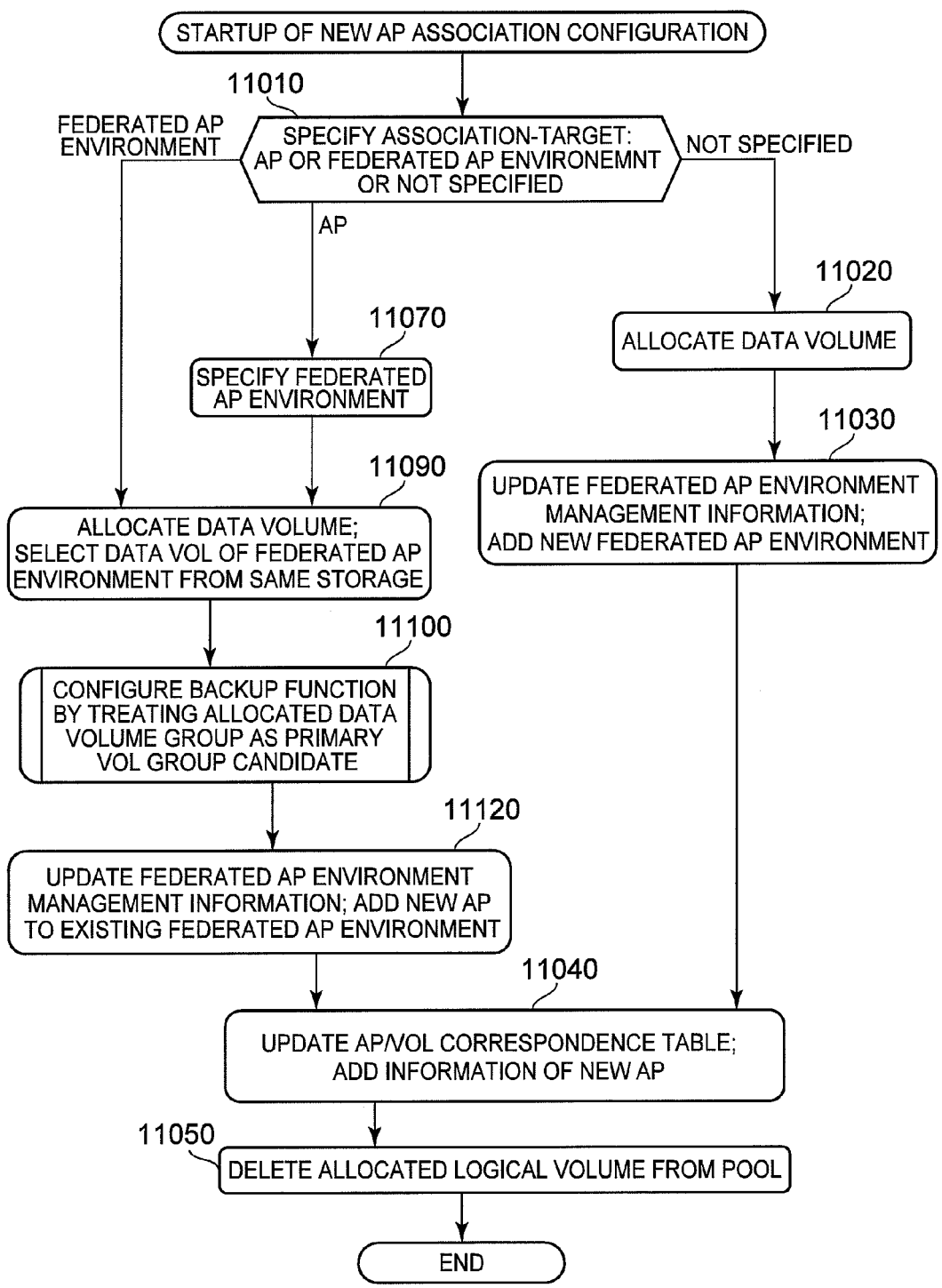
FIG. 11 is a flowchart showing the flow of processing for adding a new application to a host computer.

FIG. 11 is a flowchart showing the flow of processing for adding a new application 1161 to any host computer 1100.

This process is commenced by the administrator starting up the configuration program 1251. The configuration program 1251 receives the following four parameters at startup. However, when an application 1161 to be added is not associated with another application 1161, the configuration program 1251 need not receive parameter (11*d*).

(11*a*) Identifier allocated to a new application 1161;

(11*b*) Identifier for data IF 1022 of storage system 1000, which is recognizable to the host computer 1100 on which the new application 1161 will be run;

(11*c*) Storage capacity of data volume 2001 allocated to the new application 1161 (a plurality of data volumes 2001 can be allocated, and therefore, there can be a plurality of storage capacities.); and (11*d*) Identifier for association-target application of association-target federated application environment.

When this process is started, first, the configuration program 1251 determines whether or not parameter (11*d*) was received in Step 11010. When parameter (11*d*) has been received, the configuration program 1251 determines if this parameter (11*d*) is the identifier of an association-target application, or the identifier of an association-target federated application environment (Step 11010).

When parameter (11*d*) was not received in Step 11010, the configuration program 1251 allocates a data volume 2001 with the storage capacity specified in parameter (11*c*) to an application 1161 (since there are times when the data volume 2001 to be allocated is not limited to one, but rather comprises a plurality of data volumes 2001, hereinafter, allocated data volumes 2001 will be designated as a data volume group (or logical volume group).) (Step 11020). More specifically, the configuration program 1251 references the pool volume management table 1256, and selects either one of a plurality of unused logical volumes 1011. Then, the configuration program 1251 sends a path creation command for establishing a path between the selected logical volume group and the data IF 1022 specified in parameter (11*b*) (a path creation command, which specifies the volume IDs 9002 of the respective logical volumes of the selected logical volume group and the port ID shown by parameter (11*b*)) to the storage system 1000, which comprises this data IF 1022. Two conditions can be cited here as conditions of the respective logical volumes constituting the selected logical volume group. These are having more storage capacity than the storage capacity specified in parameter (11*c*), and being stored in the storage system 1000 comprising the data IF 1022 specified in parameter (11*b*). Furthermore, when applying some backup function to the data volume 2001 allocated here, the allocation of the logical volume 1011 required for realizing this backup function (for example, a backup volume 2003) is also carried out. Further, although not shown in the figure, when there is no unused logical volume 1011 to which the above conditions apply, the configuration program 1251 displays a warning, and ends processing.

Next, the configuration program 1251 adds a federated application environment comprising only the new application 1161 (there is no association relationship, but the program 1251 treats the new application 1161 as a federated application environment for convenience sake) to the federated AP environment management table 1252 (Step 11030). More specifically, the configuration program 1251 allocates an arbitrary identifier to a new federated application environment, and registers this identifier, the identifier of the application 1161 specified in parameter (11*a*), and the data IF 1022 specified in parameter (11*b*) in the federated AP environment management table 1252 as one record.

Next, the configuration program 1251 registers information related to the data volume group allocated to the new application 1161 in the AP/VOL correspondence table 1253 (Step 11040).

Thereafter, the configuration program 1251 deletes the records (information recorded in one row) corresponding to the respective logical volumes 1011 allocated as the data volume group in Step 11040, and the record corresponding to the logical volume 1011 allocated for realizing the backup function from the pool volume management table 1257 (Step 11050), and ends processing.

When the identifier for the association-target application is specified as parameter (11*d*) in Step 11010, the configuration program 1251 references the federated AP environment management table 1252, and specifies the federated application environment to which this association-target application belongs (Step 11070).

Conversely, when the identifier for the association-target federated application has not been specified as parameter (11*d*) in Step 11010, the configuration program 1251 carries out the processing of Step 11090 without processing Step 11070.

Next, the configuration program 1251 allocates the data volume 2001 having the storage capacity specified in parameter (11*c*) to the application 1161 (Step 11090). That is, the same as in Step 11020, the configuration program 1251 references the pool volume management table 1256, selects either one or a plurality of unused logical volumes 1011, and sends a path creation command for creating a path connecting the selected logical volume group and the data IF 1022 specified in parameter (11*b*) to the storage system 1000 comprising this data IF 1022. In addition to the two conditions described in Step 11020, conditions of the respective logical volumes constituting the selected logical volume group can also include being stored in the storage system 1000 to which the data volume 2001 utilized by the association-target federated application environment belongs. Furthermore, the same as described hereinabove, when there is no unused logical volume 1011 to which the above conditions apply, the configuration program 1251 displays a warning, and ends processing.

Next, the configuration program 1251 carries out a backup function configuration, which treats the allocated data volume group as a candidate for a primary VOL group (Step 11100). The details of this step will be explained below.

Next, the configuration program 1251 updates the federated AP environment management table 1252 (Step 11120). More specifically, the configuration program 1251 registers the identifier of the association-target federated application environment specified in either parameter (11*d*) or in Step 11070, the identifier of the application 1161 specified in parameter (11*a*), and the record comprising the data IF 1022 specified in parameter (11*b*) in the federated AP environment management table 1252.

Next, the configuration program 1251 registers information related to the data volume group allocated to the new application 1161 in the AP/VOL correspondence table 1253 (Step 11040).

Thereafter, the configuration program 1251 deletes the records corresponding to the respective logical volumes 1011 allocated as the data volume group, and the record corresponding to the logical volume 1011 allocated for realizing the backup function from the pool volume management table 1257 (Step 11050), and ends processing.

Furthermore, when associating applications 1161 to which data volumes 2001 have already been allocated, the processing of Step 11090 can be omitted. Further, when the already allocated data volumes 2001 are not stored in the same storage system 1000 as the data volumes 2001 of the association-target application, it is not possible to assign these data volumes 2001 to the same management group, and as such, the configuration program 1251 can issue a warning and end processing. Or, instead of this, the configuration program 1251 can also migrate the data volumes 2001 of the association-source application to prescribed logical volumes 1011 of the storage system 1000 comprising the data volumes 2001 of the association-target application, and assign these data volumes 2001 to the same management group without issuing a warning and ending processing. The details of these processes will be explained below.

The preceding is an explanation of the processing when adding a new application 1161 to any host computer 1100 constituting a computer system related to this embodiment.

Next, the process for configuring a backup function allocated to a target logical volume will be explained using FIG. 12. This process, for example, is executed during Step 11100 of FIG. 11. In this case, a "target logical volume" is the respective data volumes, which make up the candidates for a primary VOL group.

In this process, the configuration program 1251 receives as parameters the identifier for a target logical volume 1011, and the identifier for a cascade-source management group. As a target logical volume 1011, for example, a data volume, backup volume or snapshot volume can be employed, but when the target logical volume 1011 is a data volume, the configuration program 1251 does not receive the identifier for a cascade-source management group.

In this process, first the configuration program 1251 determines whether or not the cascade-source management group identifier has been received (Step 12010).

When the cascade-source management group identifier has been received, the configuration program 1251 references the backup policy management table 1254, and lists the management groups, in which the federated ID 7002 is either specified in parameter (11*d*) in FIG. 11, or is the identifier of the association-target federated application environment specified in Step 11070, and in which the cascade-source management group 7004 is the identifier of the cascade-source management group received at the start of this process (Step 12020). When the cascade-source management group identifier has not been received, the configuration program 1251 references the backup policy management table 1254, and lists the management groups, in which the federated ID 7002 is either specified in parameter (11*d*) in FIG. 11, or is the identifier of the association-target federated application environment specified in Step 11070, and in which "−" is recorded as the cascade-source management group 7004 (that is, in which there is no cascade-target management group) (Step 12030).

The following processing is carried out for the respective management groups that were listed. One management group (hereinafter, called the "target management group" in this explanation of FIG. 12) will be explained hereinbelow.

First, the configuration program 1251 references the backup policy management table 1254, and determines the backup function corresponding to a target management group (Step 12040).

When the result of the determination in Step 12040 is that the backup function utilized by the target management group is the local copy function, the configuration program 1251 selects a backup volume group to form a pair with the data volume group (Step 12050). More specifically, the configuration program 1251 selects a backup volume from the unused logical volumes 1011 registered in the pool volume management table 1257. The conditions of the selection at this time can include having a capacity of greater than the capacity of the primary VOL candidate, and being stored in the storage system 1000 shown in the secondary storage system ID 7006. Furthermore, when there is no logical volume 1011 that satisfies these conditions, the configuration program 1251 ends the processing for this management group, and carries out processing for another management group.

Next, the configuration program 1251 sends an indication to the storage system 1000 in which the primary VOL candidate is stored to create a local copy pair using the primary VOL candidate and the backup volume 2001 selected in Step 12050 (for example, an indication, which specifies the volume ID of the primary VOL candidate and the volume ID of the selected backup volume 2001) (Step 12060). Further, the configuration program 1251 sends an indication for assigning the local copy pair created here to the target management group (copy group 2002) (for example, an indication, which specifies the local copy pair identifier, the respective identifiers of the primary VOL and backup volume constituting this pair, and the group ID of the target management group) to the storage system 1000 (Step 12070). In the storage system, which receives the indication sent in Step 12060 and the indication sent in Step 12070, updating of the management information group 1029 is carried out in response to the received indications. Furthermore, only the updating of the management information group 1029 is carried out here; data backup is not commenced. Data backup is started after the control program 1028 of the storage system 1000 receives a backup indication from the administrator.

Next, the configuration program 1251 makes the backup volume group selected in Step 12050 the primary VOL group candidate, makes the target management group the cascade-source management group, and once again invokes this process (Step 12080).

When the result of the determination in Step 12040 is that the backup function utilized by the target management group is the CDP function, the configuration program 1251 selects a snapshot volume group to form a pair with the data volume group (Step 12090). More specifically, the configuration program 1251 selects a snapshot volume from the unused logical volumes 1011 registered in the pool volume management table 1257. The conditions of the selection at this time can include having a capacity of greater than the capacity of the primary VOL candidate, and being stored in the storage system 1000 shown in the secondary storage system ID 7006. Furthermore, when there is no logical volume 1011 that satisfies these conditions, the configuration program 1251 ends the processing for this management group, and carries out processing for another management group.

Next, the configuration program 1251 sends an indication to the storage system 1000 in which the primary VOL candidate is stored to create a CDP pair using the primary VOL candidate and the snapshot volume 3002 selected in Step 12090 (for example, an indication, which specifies the volume ID of the primary VOL candidate and the volume ID of the selected snapshot volume 3002) (Step 12100). Further, the configuration program 1251 sends an indication for assigning the CDP pair created here to the target management group (CDP journal group 3001) (for example, an indication, which specifies the CDP pair identifier, the respective identifiers of the primary VOL and snapshot volume constituting this pair, and the group ID of the target management group) to the storage system 1000 (Step 12110). In the storage system, which receives the indication sent in Step 12100 and the indication sent in Step 12110, updating of the management information group 1029 is carried out in response to the received indications. Furthermore, only the updating of the management information group 1029 is carried out here; data backup is not commenced. Data backup is started after the control program 1028 of the storage system 1000 receives a backup indication from the administrator and the configuration program 1251. Further, when backup has already commenced in the target group (CDP journal group 3001), the configuration program 1251 issues an indication to the control program 1028 to commence backup for the added CDP pair as well.

Next, the configuration program 1251 makes the snapshot volume group selected in Step 12090 the primary VOL group candidate, makes the target management group the cascade-source management group, and once again invokes this process (Step 12120).

When the result of the determination in Step 12040 is that the backup function utilized by the target management group is the remote copy function, the configuration program 1251 selects a secondary volume group to form a pair with the data volume group (Step 12130). More specifically, the configuration program 1251 selects a secondary volume from the unused logical volumes 1011 registered in the pool volume management table 1257. The conditions of the selection at this time can include having a storage capacity that is greater than the storage capacity of the primary VOL candidate, and being stored in the storage system 1000 shown in the secondary storage system ID 7006. Furthermore, when no logical volume 1011 satisfies these conditions, the configuration program 1251 ends the processing for this management group, and carries out processing for another management group.

Next, the configuration program 1251 sends an indication to both the storage system 1000 in which the primary VOL candidate is stored and the storage system 1000 shown in the secondary storage system ID 7006 to create a remote copy pair using the primary VOL candidate and the secondary volume 4003 selected in Step 12130 (for example, an indication, which specifies the volume ID of the primary VOL candidate and the volume ID of the selected secondary volume 4003) (Step 12140). Further, the configuration program 1251 sends an indication for assigning the remote copy pair created here to the target management group (remote copy journal group 4001) (for example, an indication, which specifies the remote copy pair identifier, the respective identifiers of the primary VOL and secondary volume constituting this pair, and the group ID of the target management group) to the storage system 1000 (Step 12150). In the storage system, which receives the indication sent in Step 12140 and the indication sent in Step 12150, updating of the management information group 1029 is carried out in response to the received indications. Furthermore, only the updating of the management information group 1029 is carried out here; data backup is not commenced. Data backup is started after the control program 1028 of the storage system 1000 receives a backup indication from the administrator and the configuration program 1251. Further, when backup has already commenced in the target group (remote copy journal group 4001), the configuration program 1251 issues an indication to the control program 1028 to commence backup for the added remote copy pair as well.

Next, the configuration program 1251 makes the secondary volume group selected in Step 12130 the primary VOL group candidate, makes the management group targeted for processing the cascade-source management group, and once again invokes this process (Step 12160).

Subsequent to carrying out the above processing for all the management groups listed, the configuration program 1251 determines whether or not the configuration of the backup environment was carried out normally for all the management groups listed (Step 12170). When the configuration of the backup environment was not carried out normally (more specifically, when there was a failure to update the management information group 1029 for any of the management groups), the configuration program 1251 sends an indication for canceling this configuration for the backup environment that has not been configured normally (for example, an indication, which cancels the information that failed to update from the management information group 1029) to the storage system 1000, displays a warning, and ends processing abnormally (Step 12180). When the backup environment configuration has been carried out normally, the configuration program 1251 ends this processing normally.

Furthermore, there may be times when adding a new volume pair to the CDP journal group makes it no longer possible to satisfy the protection period designated by protection period 7007, which is correspondent to this CDP journal group (for example, adding a volume pair from inside a second CDP journal group in which the protection period is three hours to a first CDP journal group in which the protection period is 10 hours may make it impossible to satisfy the protection period required in the first CDP journal group.). In this case, subsequent to the processing of Step 12110, the configuration program 1251 can select an appropriate unused logical volume 1011 (a logical volume 1011 that meets the above-described conditions) from the pool volume management table 1257, and can add the selected logical volume 1011 to the journal volume 3004. Similarly, when adding a new volume pair to the remote copy journal group makes it impossible to satisfy the protection period denoted by the protection period 7007 correspondent to this remote copy journal group, the configuration program 1251 can select an appropriate unused logical volume 1011 from the pool volume management table 1257 after the processing of Step 12150, and can add the selected logical volume 1011 to the remote journal volume 4002.

Figure 12:
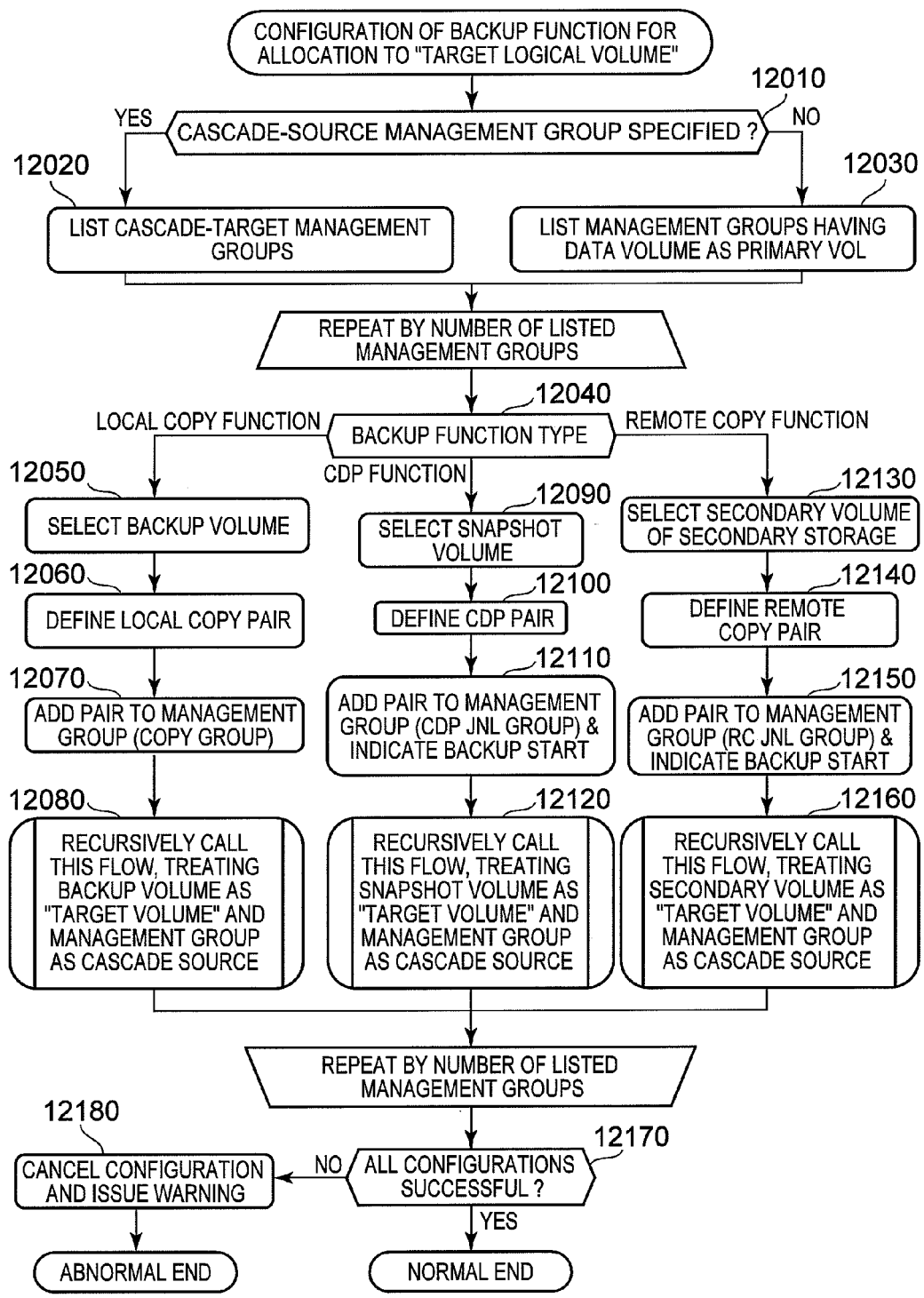
FIG. 12 is a flowchart showing the flow of processing for configuring a backup function allocated to a target logical volume.

As described above, a backup environment, in which all the data volumes allocated to a new application and all the data volumes of an application, which belongs to an association-target federated application environment, are comprised in the same management group, is constructed in accordance with the processing of FIGS. 11 and 12. The administrator, who started the configuration program 1251, does not have to know the overall configuration of the federated application environment at this time.

Figure 13:
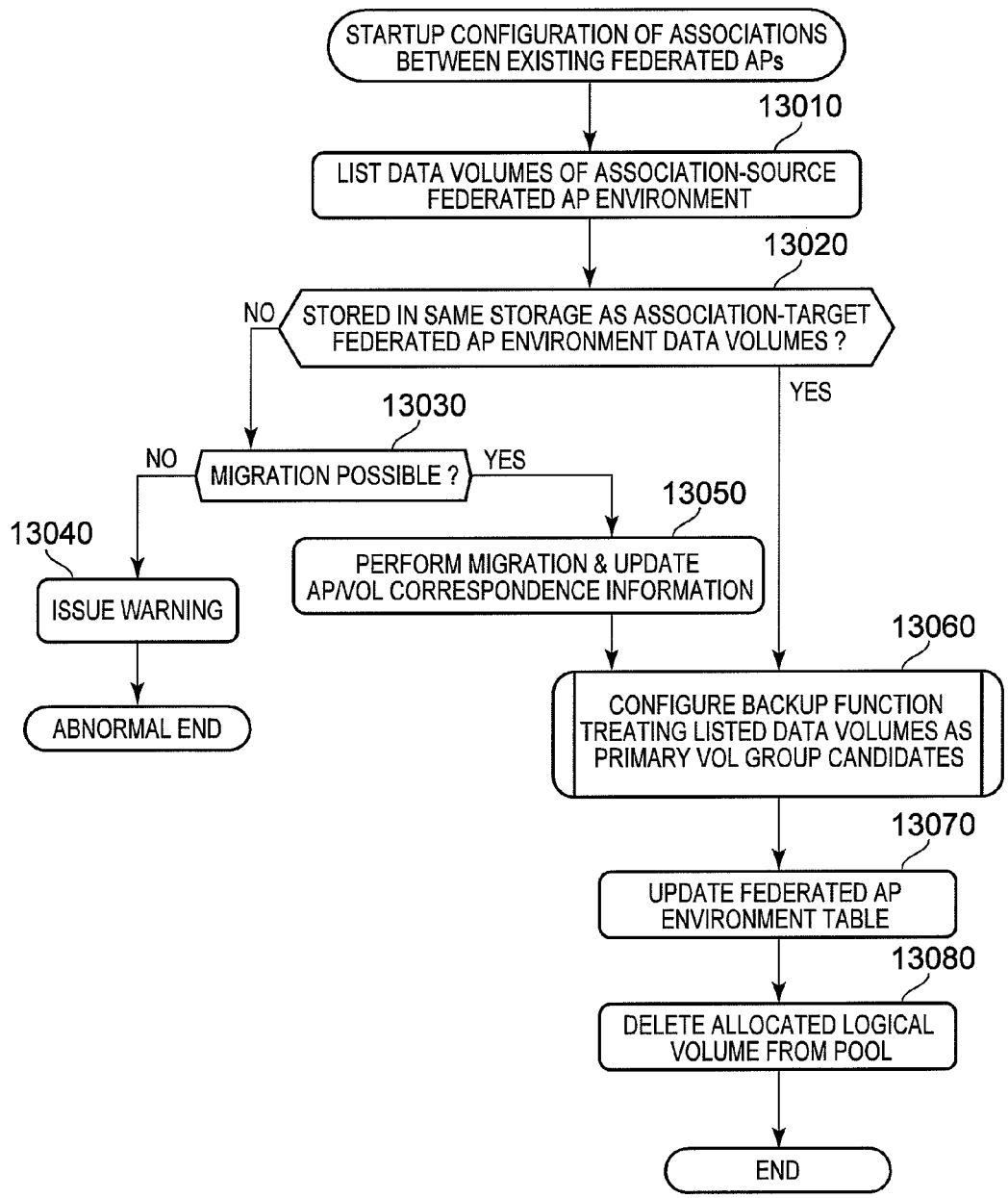
FIG. 13 is a flowchart showing the flow of processing for associating existing federated application environments.

FIG. 13 is a flowchart showing the flow of processing for associating existing federated application environments to one another.

This process is commenced by the administrator starting up the configuration program 1251. The configuration program 1251 receives the following two parameters at startup.

(13*a*) Identifier of association-source federated application environment.

(13*b*) Identifier of association-target federated application environment.

When this processing commences, the configuration program 1251 lists the data volumes 2001 of the association-source federated application environment (Step 13010). More specifically, the configuration program 1251 references the federated AP environment management table 1252, specifies records, which have the identifier of the association-source federated application environment in the federated ID 5001, lists the application IDs 5002 from the specified records, references the AP/VOL correspondence table 1253 thereafter, and lists the volume IDs 6003 corresponding to the listed application IDs 5002.

Next, the configuration program 1251 determines if the listed data volumes 2001 are stored in the same storage system 1000 as the data volumes 2001 of the association-target federated application environment (Step 13020).

When the listed data volumes 2001 are stored in the same storage system 1000, the configuration program 1251 carries out Step 13060.

Conversely, when at least one data volume 2001 of the listed data volumes 2001 is stored in a different storage system 1000, the configuration program 1251 determines whether or not it is possible to migrate this data volume 2001 to the storage system 1000 to which the data volumes 2001 of the association-target federated application environment belong (Step 13030). Furthermore, migration is determined to be possible here when all the conditions, such as both storage systems 1000 being connected (determined by referencing the storage interconnection management table 1257), both storage systems 1000 comprising the remote copy function (determined by referencing the storage function management table 1255), the migration-target logical volume being capable of being secured (determined by referencing the pool volume management table 1256), and the host computer 1100, on which an application 1161 belonging to the association-source federated application environment is run, being capable of recognizing the data IF 1022 of the migration-target storage system 1000 (determined by referencing the federated AP environment management table 1252), have all been met.

When migration is not possible, the configuration program 1251 displays a warning (Step 13040) and ends processing abnormally.

Conversely, when migration is possible, the configuration program 1251 sends a migration indication to both storage systems 1000 (for example, an indication, which specifies the ID of a migration-source logical volume and the ID of a migration-target logical volume) (Step 13050). Based on this indication, a data volume 2001 corresponding to the association-source application environment is migrated to the storage system 1000 to which the data volume 2001 of the association-target federated application environment belongs. More specifically, the data inside the data volume 2001 corresponding to the association-source application environment is migrated to the migration-target logical volume secured by this storage system 1000. Furthermore, the migration-target logical volume 1011 is selected by referencing the pool volume management table 1256. Subsequent to migration being completed, the AP/VOL correspondence table 1253 is updated.

Next, the data volumes 2001 listed in Step 13010 (including the migrated data volume 2001 when Step 13050 has been carried out) are treated as primary VOL group candidates, and the configuration of the backup function is carried out (Step 13060). The same processing as that shown in FIG. 12 is carried out in this step.

Thereafter, the configuration program 1251 associatively registers the identifier of the association-target federated application environment and the application ID 5002 listed in Step 13010 in the federated AP environment management table 1252 (Step 13070). Then, the configuration program 1251 deletes the record related to the migration-target logical volume 1011 from the pool volume management table 1256 (Step 13080), and ends processing.

Furthermore, in addition to this process, when it is desirable to apply the backup environment of the association-source federated application environment to the association-target federated application environment, the association-target federated application environment can be substituted for the association-source federated application environment in this process (that is, the identifier of the association-source federated application environment of this process is treated as the identifier of the association-target federated application environment, and the identifier of the association-target federated application environment of this process is treated as the identifier of the association-source federated application environment) and this process can be executed once again, or the data volume corresponding to the association-target federated application environment can be migrated to the storage system having the data volume used by the association-source federated application.

Further, when it is desirable to delete the backup environment of the association-source federated application environment, immediately following Step 13010, the configuration program 1251 sends an indication to cancel the backup environment associated to the data volumes 2001 listed in Step 13010 (for example, a backup environment cancel indication, which specifies the identifiers of these data volumes 2001) to the storage system 1000. In response to this indication, the control program 1028 of the storage system 1000 is able to cancel the information related to the configuration of the management group comprising the specified data volumes 2001 from the management information group 1029. Furthermore, since the storage system 1000 manages the information of the backup environment related to the data volumes 2001 as the management information group 1029 as described hereinabove, the configuration program 1251 can acquire and cancel this information from the management information group 1029. When the deletion of the backup environment is complete, the configuration program 1251 deletes all records having the association-source federated application environment identifier in the federated ID 7002 from the backup policy management table 1256. Further, the configuration program 1251 deletes all records having the association-source federated application environment identifier in the federated ID 5001 from the federated AP environment management table 1252.

In accordance with the above process, it is possible to construct a backup environment when associating federated application environments such that data volumes 2001 of all the applications 1161 belonging to the respective federated application environments can be backed up in the same management group.

Figure 14:
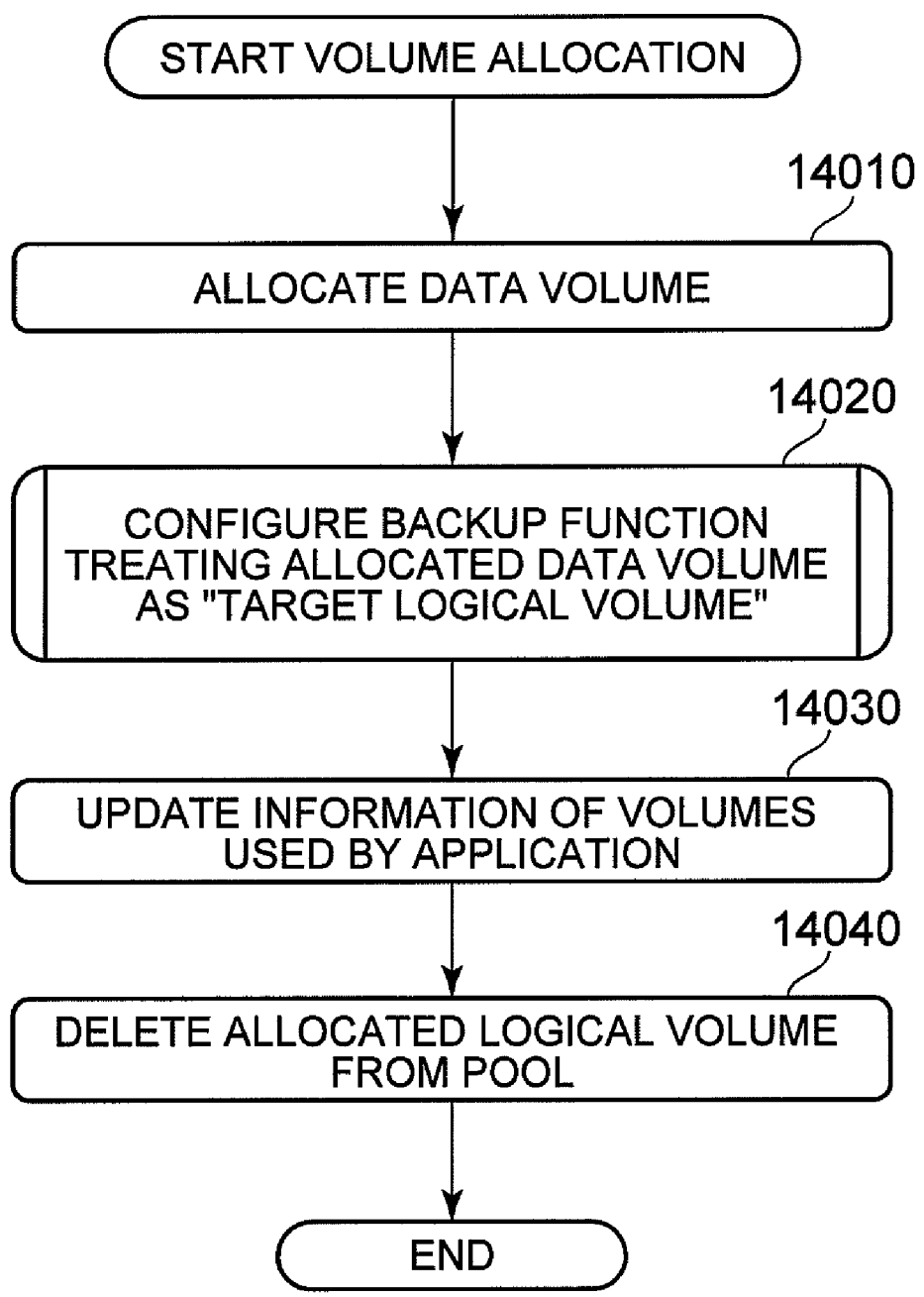
FIG. 14 is a flowchart showing the flow of processing for allocating a new data volume to an application, which belongs to an existing federated application environment.

FIG. 14 is a flowchart showing the flow of processing for allocating a new data volume 2001 to an application 1161 belonging to an existing federated application environment.

This process is commenced by the administrator starting up the configuration program 1251. The configuration program 1251 receives the following three parameters at startup.

(14*a*) Identifier for application 1161, which carries out allocation of a data volume 2001.
(14*b*) Identifier for data IF 1022 of storage system 1000 recognizable to the host computer 1100, which runs this application 1161.
(14*c*) Capacity of allocated data volume 2001.

When this process commences, first, the configuration program 1251 allocates a data volume 2001 having the capacity specified in parameter (14*c*) to the application 1161 (Step 14010). That is, the configuration program 1251 references the pool volume management table 1256, and selects either one or a plurality of unused logical volumes 1011. Then, the configuration program 1251 sends an indication for establishing a path connecting the data IF 1022 specified in parameter (14*b*) to the selected logical volume group to the storage system 1000 comprising this data IF 1022. The selection conditions for the logical volume 1011 at this time can include having capacity greater than that specified in parameter (14*c*), being stored in the storage system 1000 comprising the data IF 1022 specified in parameter (14*b*), and being stored in the same storage as any application data volumes of which the allocation-target data volume belongs to a federated application environment (the federated application environment to which the allocation-target application of this data volume belongs). Furthermore, when there is no logical volume 1011 to which the above conditions apply, the configuration program 1251 displays a warning and ends processing.

Next, the configuration program 1251 makes the allocated data volume group the primary VOL group candidate, and carries out the configuration of the backup function (Step 14020). This step is equivalent to the processing shown in FIG. 12 with the exception of the following point. That is, in Steps 12020 and 12030, the association-target federated application environment is treated as the federated application environment to which the application 1161, which carries out the allocation of the data volume 2001, belongs.

Next, the configuration program 1251 registers the record related to the allocated data volume 2001 (for example, the record comprising this data volume 2001 identifier and the allocation-target application identifier) in the AP/VOL correspondence table 1253 (Step 14030).

Finally, the configuration program 1251 deletes from the pool volume management table 1256 the records corresponding to the logical volumes 1011 allocated as the data volume group, and the records corresponding to the logical volumes 1011 utilized to construct the backup environment (Step 14040) and ends processing.

In accordance with the above process, it is possible to construct a backup environment such that, when allocating a new volume to an application, which belongs to a federated application environment, this volume can be backed up in the same management group as this federated application environment.

Figure 15:
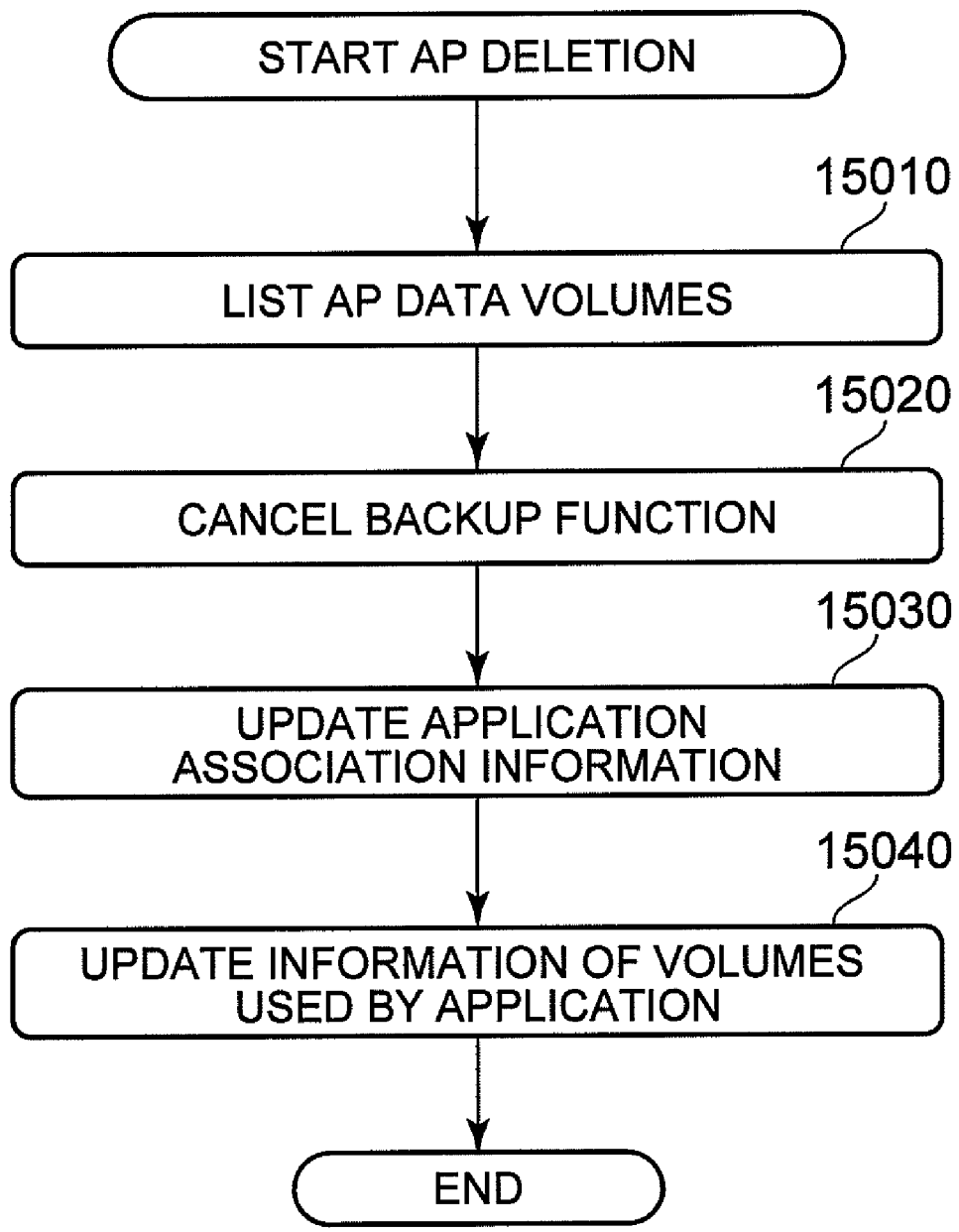
FIG. 15 is a flowchart showing the flow of processing for deleting an application from an existing federated application environment.

FIG. 15 is a flowchart showing the flow of processing for deleting an application 1161 from an existing federated application environment.

This process is commenced by the administrator starting up the configuration program 1251. The configuration program 1251 receives the following parameter at startup.

(15*a*) Identifier for application 1161 to be deleted.

When this process is started, first, the configuration program 1251 lists the data volumes 2001 used by the application 1161 to be deleted (Step 15010).

Next, the configuration program 1251 issues an indication to the storage system 1000 to cancel the backup function configuration related to the listed data volumes 2001 (Step 15020). Since the information of the backup environment related to the data volumes is managed as the management information group 1029 by the storage system 1000 as described above, the configuration program 1251 can acquire this information from the management information group 1029.

Thereafter, the configuration program 1251 deletes the information related to the application 1161 targeted for deletion from the federated application environment management table 1252.

Finally, the configuration program 1251 deletes the records related to the application 1161 targeted for deletion from the AP/VOL correspondence table 1253, and ends processing.

In accordance with the above processing, it is possible to delete data volumes 2001 allocated to an application 1161, which does not need to belong to the federated application environment (for example, an application, which does not have an association relationship with another application) from the management group corresponding to this federated application environment.

Figure 16:
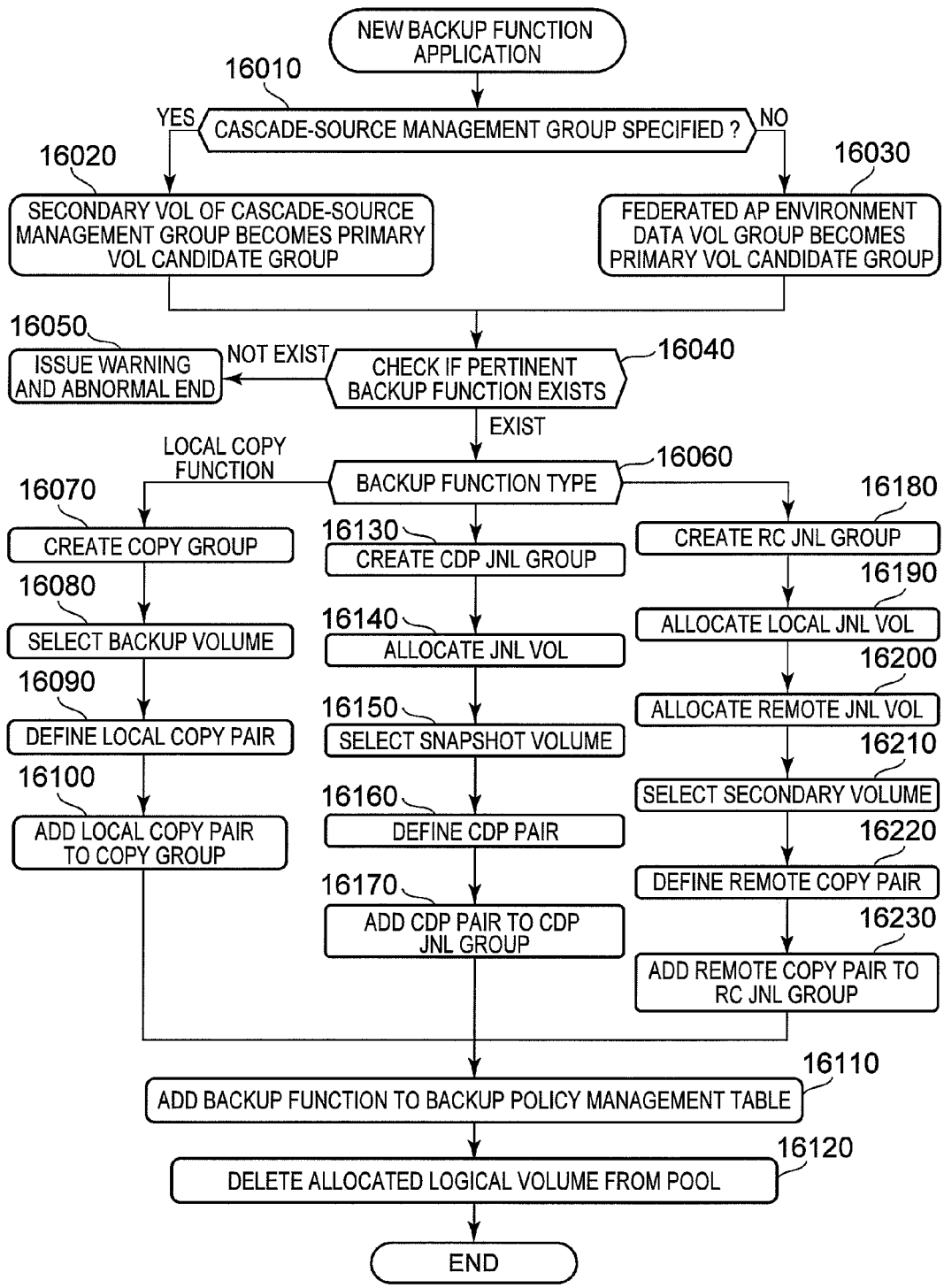
FIG. 16 is a flowchart showing the flow of processing for allocating a new backup function to a federated application environment.

FIG. 16 is a flowchart showing the flow of processing for constructing a new backup environment for a federated application environment and allocating same thereto.

This process is commenced by the administrator starting up the configuration program 1251. The configuration program 1251 receives the following five parameters at startup. However, when a backup-source logical volume 1011 is a data volume 2001, parameter (16*c*) is not required. Further, when the backup function is not the remote copy function, parameter (16*d*) is not required. Furthermore, when the backup function is the local copy function, parameter (16*e*) is not required.

(16*a*) Type of the backup function;
(16*b*) Identifier of the federated application environment, which applies the backup function;
(16*c*) Identifier of the cascade-source management group;
(16*d*) Secondary storage system ID; and
(16*e*) Protection period.

When this process commences, the configuration program 1251 determines whether or not the cascade-source management group identifier, which is parameter (16*c*), has been received (Step 16010).

When parameter (16*c*) has been received, the configuration program 1251 makes the secondary VOL group of the cascade-source management group specified in parameter (16*c*) the primary VOL group candidate (Step 16020). Furthermore, since the information related to the secondary VOL group of the cascade-source management group is managed by the storage system 1000 as the management information group 1029, the configuration program 1251 can acquire this information from the management information group 1029.

Conversely, when parameter (16*c*) has not been received, the configuration program 1251 makes the data volumes 2001 utilized in the federated application environment, which is the allocation target of the backup function, the primary VOL group candidates.

Next, the configuration program 1251 determines whether or not the storage system 1000 has the backup function specified in parameter (16*a*) (Step 16040). For example, if the backup function specified in parameter (16*a*) is either the local copy function or the CDP function, the configuration program 1251 identifies the backup function of the storage system 1000 in which the primary VOL group candidate is stored by referencing the storage function management table 1255. Conversely, if the backup function specified in parameter (16*a*) is the remote copy function, firstly, the configuration program 1251 identifies the backup function of the storage system 1000 in which the primary VOL group candidate is stored, and the backup function of the secondary storage system specified in parameter (16*d*) by referencing the storage function management table 1255. Secondly, the configuration program 1251 determines if it is possible to transfer data between the above-mentioned two storage systems 1000 by referencing the storage interconnection management table 1257.

When the result of the determination on Step 16040 is that the storage system 1000 does not have the backup function specified in parameter (16*a*), the configuration program 1251 issues a warning to the administrator, and ends abnormally (Step 16050).

Conversely, when the result of the determination in Step 16040 is that the storage system 1000 does have the backup function specified in parameter (16*a*), the configuration program 1251 executes the following processing in accordance with the specified backup function (Step 16060).

When the specified backup function is the local copy function, first, the configuration program 1251 sends an indication to the storage system 1000 in which the primary VOL group candidate is stored to create a copy group 2002 (Step 16070). Next, the configuration program 1251 selects a backup volume 2001 from the unused volume group denoted in the pool volume management table 1256 (Step 16080). Then, the configuration program 1251 sends an indication to the storage system 1000 to create a local copy pair, which is constituted by the primary VOL group candidate and the backup volume 2001 selected in Step 16080 (Step 16090). Further, the configuration program 1251 sends an indication to the storage system 1000 to add the local copy pair created by the indication sent in Step 16090 in the copy group 2002 created by the indication sent in Step 16070 (Step 16100). Finally, the configuration program 1251 adds information related to the newly created copy group 2002 (for example, a record comprising the group ID 7001 and backup function 7003) to the backup policy management table 1254 (Step 16110), deletes the record corresponding to the volume selected in Step 16080 from the pool volume management table 1256 (Step 16120), and ends processing.

When the specified backup function is the CDP function, first, the configuration program 1251 sends an indication to the storage system 1000 in which the primary VOL group candidate is stored to create a CDP journal group 3001 (Step 16120). Next, the configuration program 1251 selects a journal volume 3004 from the unused volume group depicted in the pool volume management table 1256, and sends an indication to the storage system 1000 to associate this journal volume 3004 to the CDP journal group 3001 created by the indication sent in Step 16120 (Step 16140). Next, the configuration program 1251 selects a snapshot volume 3002 from the unused volume group denoted in the pool volume management table 1256 (Step 16150). Then, the configuration program 1251 sends an indication to the storage system 1000 to create a CDP pair, which is constituted by the primary VOL group candidate and the snapshot volume 3002 selected in Step 16150 (Step 16160). Further, the configuration program 1251 sends an indication to the storage system 1000 to add the CDP pair created by the indication sent in Step 16160 to the CDP journal group 3001 created by the indication sent in Step 16130 (Step 16170). Finally, the configuration program 1251 adds information related to the newly created CDP journal group 3001 (for example, a record comprising the group ID 7001 and the protection period 7007 specified in parameter (16*e*)) to the backup policy management table 1254 (Step 16110), deletes the record corresponding to the newly selected logical volume 1011 from the pool volume management table 1256 (Step 16120), and ends processing.

When the specified backup function is the remote copy function, first, the configuration program 1251 sends an indication to both the storage system 1000 in which the primary VOL group candidate is stored and the secondary storage system to create a remote copy journal group 4001 (Step 16180). Next, the configuration program 1251 selects a local journal volume 4004 from the unused volume group depicted in the pool volume management table 1256, and sends an indication to the storage system 1000 to associate the selected local journal volume 4004 to the remote copy journal group 4001 created by the indication sent in Step 16180 (Step 16190). Next, the configuration program 1251 selects a remote journal volume 4002 from the unused volume group denoted in the pool volume management table 1256, and sends an indication to the storage system 1000 to associate the selected remote journal volume 4002 to the remote copy journal group 4001 created by the indication sent in Step 16180 (Step 16200). Next, the configuration program 1251 selects a secondary volume from the unused volume group denoted in the pool volume management table 1256 (Step 16210). Then, the configuration program 1251 sends an indication to the storage system 1000 to create a remote copy pair constituted by the primary VOL group candidate and the secondary volume selected in Step 16210 (Step 16220). Further, the configuration program 1251 sends an indication to the storage system 1000 to add the remote copy pair created by the indication sent in Step 16220 to the remote copy journal group 4001 created by the indication sent in Step 16180 (Step 16230). Finally, the configuration program 1251 adds information related to the newly created remote copy journal group 4001 (for example, a record comprising the group ID 7001 and the protection period 7007 specified in parameter (16*e*)) to the backup policy management table 1254 (Step 16110), deletes the record corresponding to the newly selected logical volume 1011 from the pool volume management table 1256 (Step 16120), and ends processing.

The preceding is an explanation of the processing for constructing a new backup environment for the federated application environment and allocating same thereto. According to this process, it is possible to apply a backup function in the batch mode to all logical volumes 1011 used by the federated application environment.

The preceding is an explanation of the first embodiment. According to this embodiment, all the data volumes 2001 utilized by the federated application environment are guaranteed to be backed up in the same management group.

Second Embodiment

A second embodiment will be explained next.

In a large-scale computer system, the load of remote copying carried out between a single primary storage system 4000 and a single secondary storage system 4100 can become high, thereby lowering I/O performance and adversely affecting work. To solve for this problem, there is technology (for example, the technology disclosed in Japan Patent Laid-open No. 2005-190455), which carries out load balancing by using a plurality of primary storage systems 4000 and a plurality of secondary storage system 4100. According to this technology, it is possible to create a group, which brings together a plurality of the remote copy journal groups 4001 described in the first embodiment. This group can be created spanning a plurality of storage systems 1000. Hereinafter, this group will be called a "global journal group". All the primary storage systems 4000 belonging to the global journal group share the same timer ("share the same timer" referred to here signifies that the time is the same for all primary storage systems 4000). Then, when a write is generated, a time acquired from this timer is assigned as an attribute of the journal to be created. Further, when a journal transferred to a secondary storage system 4100 is applied to a secondary volume 4003, journals in the respective secondary storage systems up to the specified same point in time of the oldest of the times assigned to new journals received by the respective secondary storage systems 4100 are applied. Consequently, it is possible to restore data of the same point in time in the secondary volumes 4003 of all the secondary storage systems 4100. Hereinafter, this type of backup function will be called a "multi spanned remote copy function".

(2-1) System Configuration of Second Embodiment

Since the configuration of the computer system related to this embodiment is practically the same as that of the first embodiment, mainly the differences will be explained.

Figure 17:
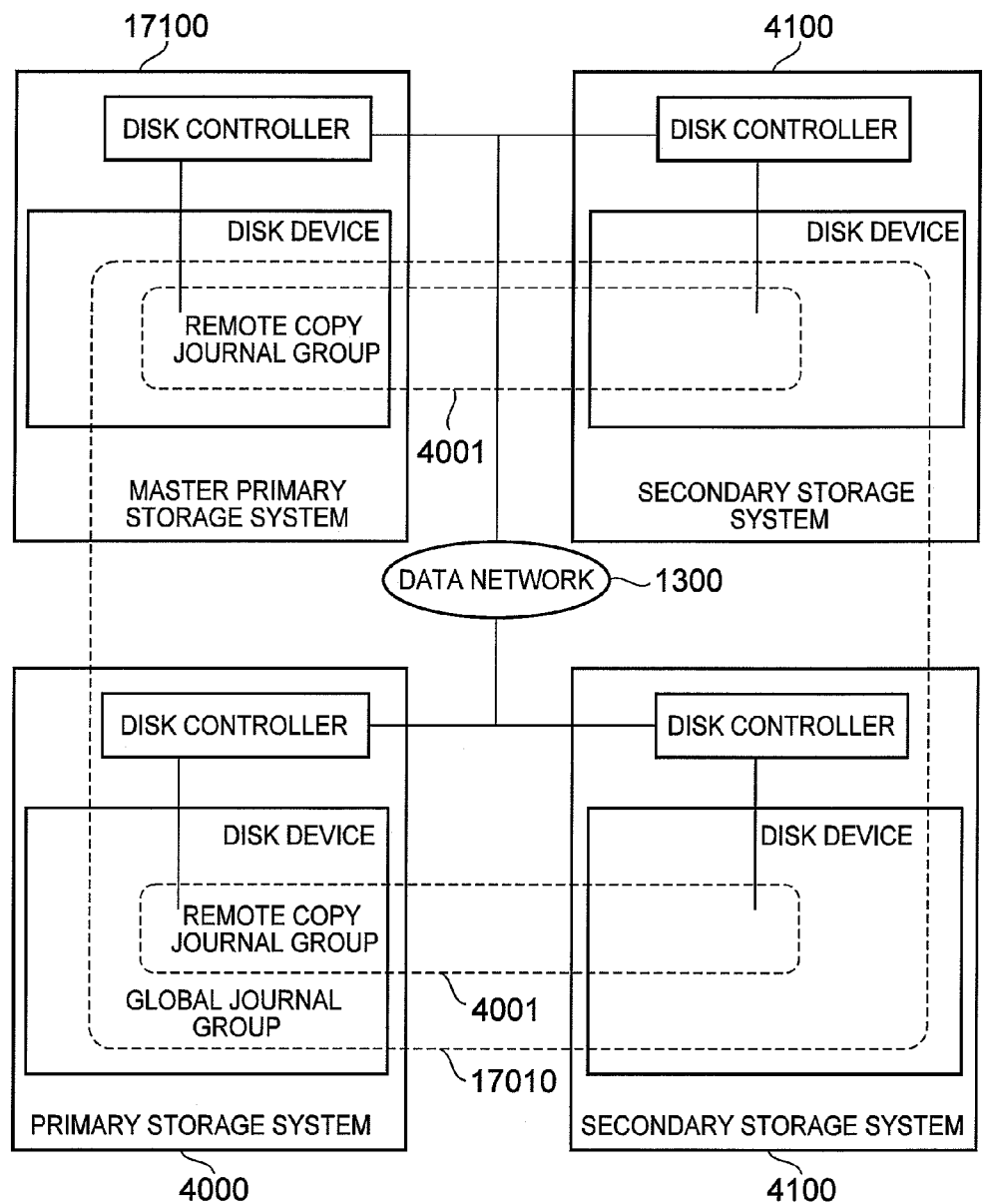
FIG. 17 is a block diagram showing an example of the constitution of a computer system related to a second embodiment.

FIG. 17 is a block diagram showing an example of the configuration of a computer system related to this embodiment.

The global journal group 17010 is constituted from one or more remote copy journal groups 4001. The storage systems 1000, which store the data volumes 2001 and secondary volumes 4003, which constitute these remote copy journal groups 4001, are connected via the data network 1300, and are capable of exchanging data and control information with one another.

Further, one of the plurality of primary storage systems 4000 belonging to the global journal group 17010 becomes the master primary storage system 17100. The timer comprising this master primary storage system 17100 (not shown in the figure) is shared with the other primary storage systems 4000. When the control program 1028 of a primary storage system 4000 creates a journal, the time of this shared timer 1024 is assigned. To reference the timer 1024, the control programs 1028 of the respective primary storage systems 4000 use the management information groups 1029 comprising the respective storage systems 1000 to manage which remote copy journal groups 4001 belong to which global journal groups 17010, and which storage systems 1000 are the master primary storage systems 17100 of the respective global journal groups 17010.

Further, when a journal received from a primary storage system 4000 is applied to a secondary volume 4003, the control program 1028 of the secondary storage system 4100 associates the respective secondary storage systems 4100 of the same global journal group 17010, compares the times assigned to the newest journals received by the respective secondary storage systems 4100, and applies the journal of prior to the oldest time to the secondary volume 4003. Thus, the control program 1028 of the secondary storage system 4100 manages which remote copy journal group 4001 belongs to which global journal group 17010 using the management information group 1029 comprising this storage system 1000.

Furthermore, although not shown in this figure, in this embodiment, it is possible to store the value depicting the multi spanned remote copy function (for example, "multi spanned remote") in the backup function 7003 of the backup policy management table 1254. Further, in the multi spanned remote copy function, the identifiers of a plurality of storage systems 1000 can be recorded in the primary storage system ID 7005 and in the secondary storage system ID 7007.

(2-2) Processing Carried Out by Second Embodiment

Since the processing carried out by this embodiment is practically the same as that of the first embodiment, mainly the differences will be explained.

Figure 18:
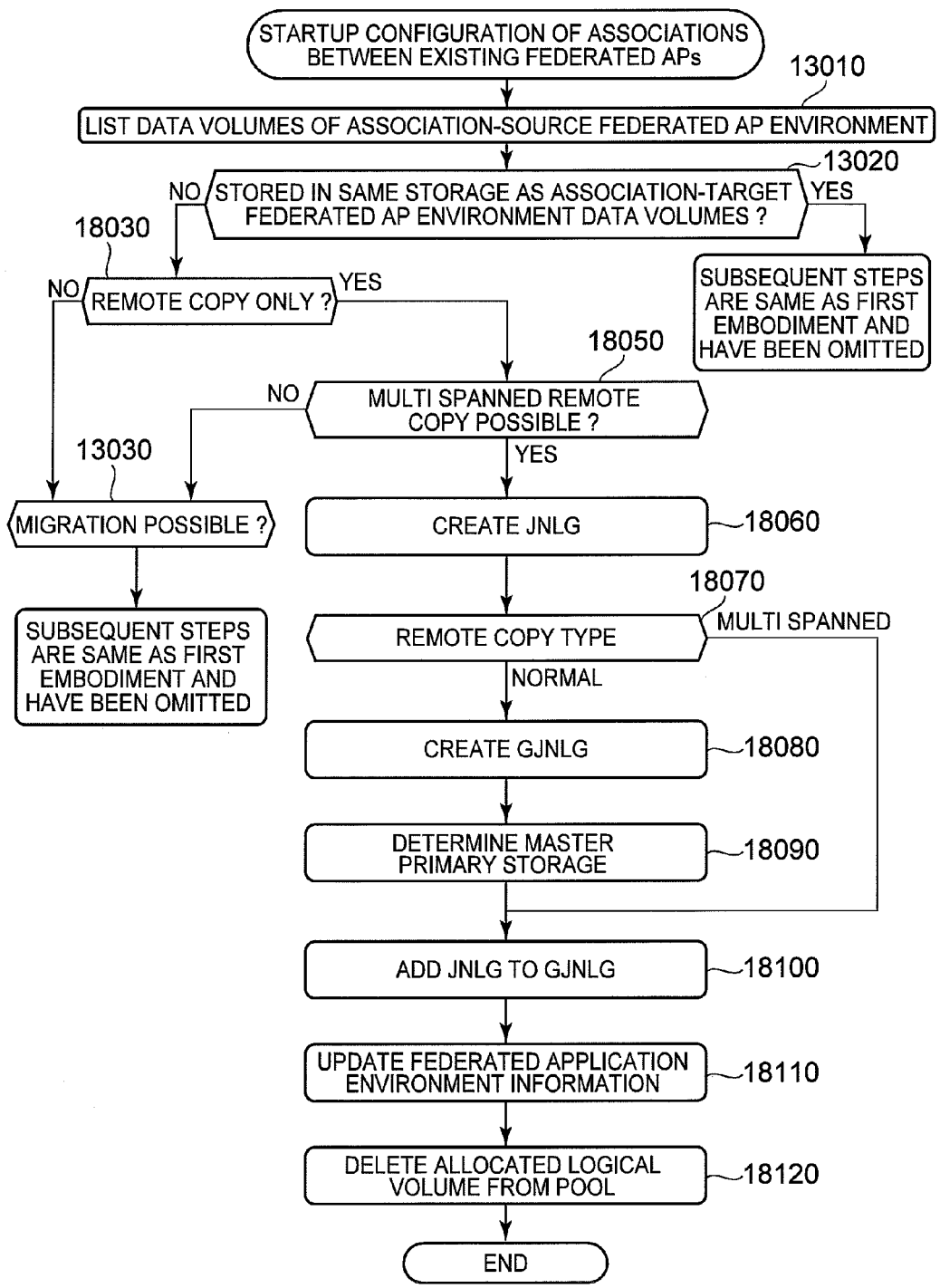
FIG. 18 is a flowchart showing the flow of processing for associating existing federated application environments in the second embodiment.

FIG. 18 is a flowchart showing the flow of processing for associating existing federated application environments in this embodiment.

This process is commenced by the administrator starting up the configuration program 1251. The configuration program 1251 receives the following two parameters at startup.

(18*a*) Identifier of association-source federated application environment; and (18*b*) Identifier of association-target federated application environment.

The processing in Steps 13010 and 13020 is the same as that explained using FIG. 13. Further, when it is determined in Step 13020 that the listed data volumes 2001 are stored in the same storage system 1000 as the data volumes 2001 of the association-target federated application environment, the subsequent processing is the same as that explained using FIG. 13. That is, when the determination result in Step 13020 is YES, thereafter, the processing of Steps 13060, 13070, and 13080 in FIG. 13 is carried out in order.

When it is determined in Step 13020 that the listed data volumes 2001 are stored in a different storage system 1000, the configuration program 1251 references the backup policy management table 1254, and determines whether or not the backup function applied to the association-target application environment is the remote copy function alone (Step 18030).

When other copy functions are included, Steps 13030 and 13040 of FIG. 13 are carried out in order.

When the backup function applied to the association-target application environment comprises only the remote copy function, the configuration program 1251 determines whether or not it is possible to apply the multi spanned remote copy function (Step 18050). At this point, the configuration program 1251 references the backup policy management table 1254, and determines whether or not the respective storage systems 1000 denoted by the primary storage system ID 7005 and secondary storage system ID 7006 of this management group, and the storage system 1000 to which belongs the data volume 2001 of the association-source federated application environment have the multi spanned remote copy function. Further, the configuration program 1251 determines whether or not the respective storage systems 1000 are able to exchange data and control commands with each other by referencing the storage interconnection management table 1257. When the respective storage systems 1000 have the multi spanned remote copy function, and the respective storage systems 1000 are capable of exchanging data and control commands with each other, this processing moves to Step 18060. Otherwise, this processing moves to Step 13030.

In Step 18060, the configuration program 1251 treats the data volumes 2001 of the association-source federated application environment as the primary VOL group, creates a remote copy pair, and creates a remote copy journal group 4001. Furthermore, with the exception of the following point, this process is the same as the creation method for the remote copy journal group 4001 explained using FIG. 16 (Steps 16180 through 16230). That is, belonging to a storage system 1000 in which this secondary volume 4003 has the multi spanned remote copy function is further added as a condition for selecting a secondary volume 4003.

Next, the configuration program 1251 determines the backup type of the created remote copy journal group 4001 (Step 18070).

If the remote copy function is normal, first, the configuration program 1251 sends an indication for creating a global journal group 17010 to the storage system 1000, which is shown in the primary storage system ID 7005 and secondary storage system ID 7006 corresponding to the created remote copy journal group 4001 (Step 18080). The configuration program 1251 allocates a prescribed identifier to this global journal group 17010 at this time.

Next, the configuration program 1251 respectively sends to the storage systems 1000 shown in the primary storage system ID 7005 and secondary storage system ID 7006 an indication to make the storage system 1000, which is shown in primary storage system ID 7005 corresponding to the one created remote copy journal group 4001, the master primary storage system (Step 18090).

Next, the configuration program 1251 respectively sends an indication to the primary storage system group and secondary storage system group belonging to the global journal group 17010, and the primary storage system 4000 and secondary storage system 4100 of the remote copy journal group 4001 created in Step 18060 to add the remote copy journal group 4001 created in Step 18060 to the global journal group 17010 (Step 18110). The configuration program 1251 acquires information related to this global journal group 17010 from the other storage system 1000 at this time, and communicates this information to the primary storage system 4000 and secondary storage system 4100 of the remote copy journal group 4001 created in Step 18060. This information, for example, is information of the remote copy journal group 4001 and information of the master primary storage system belonging to this global journal group 17010.

Then, as explained using FIG. 13, the configuration program 1251 updates the federated AP environment management table 1252 (Step 18110), deletes the record corresponding to the allocated logical volume 1011 from the pool volume management table 1257 (Step 18120), and ends processing.

The preceding is an explanation of the second embodiment. According to this embodiment, in a computer system, which associates applications 1161 using data volumes 2001 of different storage systems, a backup by a management group, which spans storage systems 1000, is guaranteed.

<Third Embodiment>

A third embodiment will be explained next.

In the third embodiment, an application 1161 has an information resource in which information related to itself and an associated application 1161 is recorded, and information related to the association of applications 1161 comprised in a federated application environment (hereinafter "association information") is inputted by using this information resource.

(3-1) System Configuration of Third Embodiment

Since the configuration of the computer system related to this embodiment is practically the same as that of the first embodiment, mainly the differences will be explained.

Figure 19:
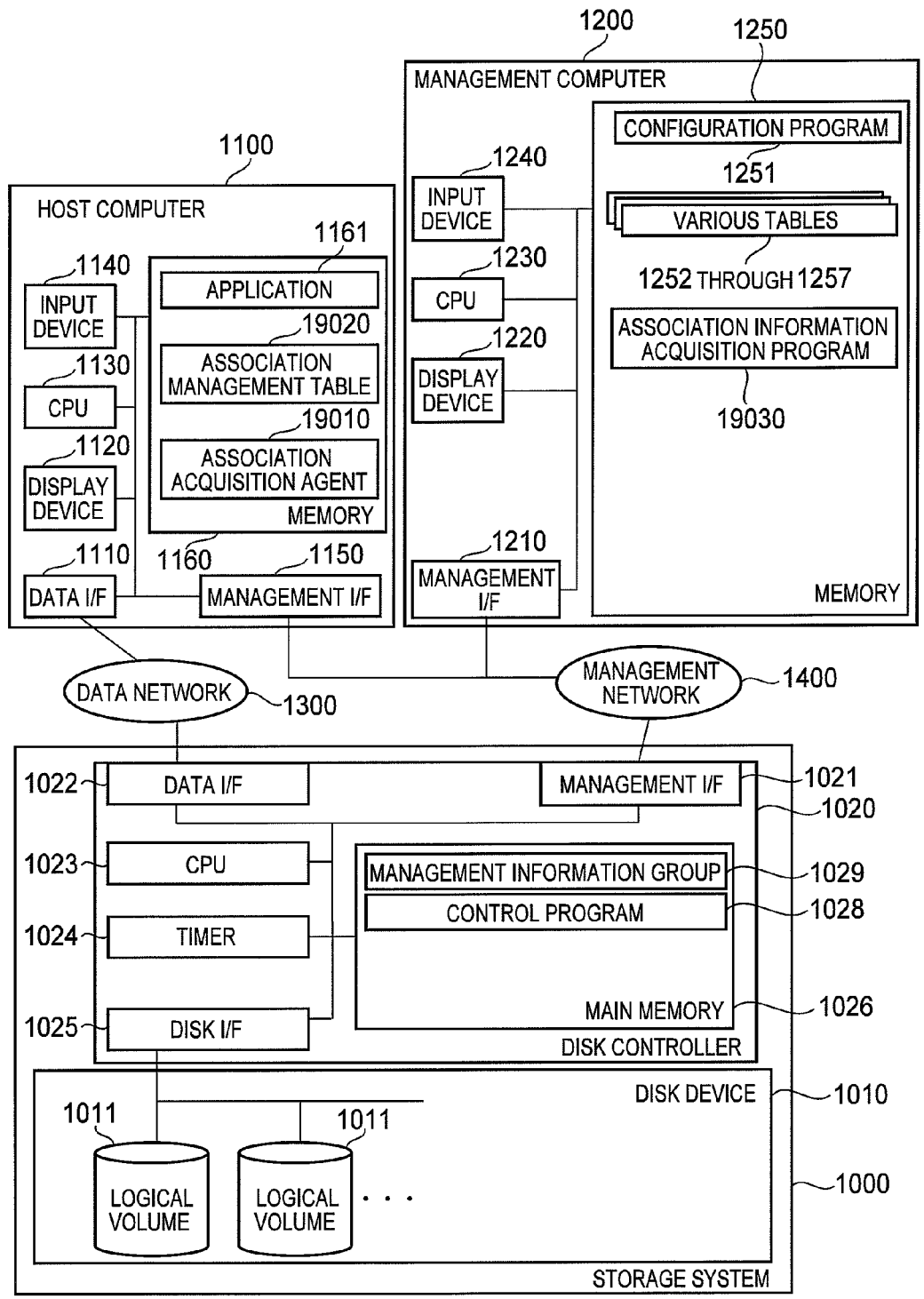
FIG. 19 is a block diagram showing an example of the constitution of a computer system related to a third embodiment.

FIG. 19 is a block diagram showing an example of the configuration of a computer system related to this embodiment.

In this embodiment, an association acquisition agent 19010 and an association management table 19020 are also recorded in the memory 1160 of the host computer 1100.

The association management table 19020 is one type of the above-mentioned information resource, in which is recorded information showing an application 1161 to which this application 1161 is associated.

The association acquisition agent 19010 acquires association information from the association management table 19020 in response to a request from an association information acquisition program 19030, which will be explained below, and sends the acquired association information to the association information acquisition program 19030. The association information, for example, comprises information showing an application 1161 to which this application 1161 is associated; the network address of the host computer 1100, which runs the application 1161 to which this application 1161 is associated; and information listing the data volumes 2001 used by this application 1161. The flow of this processing will be explained below.

Further, an association information acquisition program 19030 is also recorded in the memory 1250 of the management computer 1200.

The association information acquisition program 19030 either regularly or irregularly acquires association information from the association acquisition agent 19010 run by the host computer 1100. The flow of this processing will be explained below.

FIG. 20 is a diagram showing an example of a federated AP environment management table 1252' related to this embodiment.

Since the brunt of this table 1252' is the same as that of the first embodiment, mainly the differences will be explained.

A network address 20004 is also recorded in this table 1252'. The network address 20004 is a network address (for example, an IP address) of the host computer 1100 on which the application 1161 shown in the application ID 5002 is running. The corresponding relationships of the respective information elements in this table 1252' are configured by the association information acquisition program 19030. The flow of this configuring will be explained below.

FIG. 21 is a diagram showing an example of the association management table 19020.

This table 19020 manages information of the application 1161 to which the application 1161 in question is associated.

The application ID 21001 is the identifier of the association-source application, in other words, it is the identifier the application 1161 being run by the host computer 1100, which manages this table 19020. The association-target application ID 21002 is the identifier of the association-target application. The network address 21003 is the network address of the host computer 1100 on which the application 1161 shown in the association-target application ID 21002 is running. The corresponding relationship of the respective information elements in this table 19020 is configured by the administrator when an association-target application is added.

(3-2) Processing Carried Out by Third Embodiment

Since the operation of this embodiment is practically the same as that of the first embodiment, mainly the differences will be explained.

Figure 22:
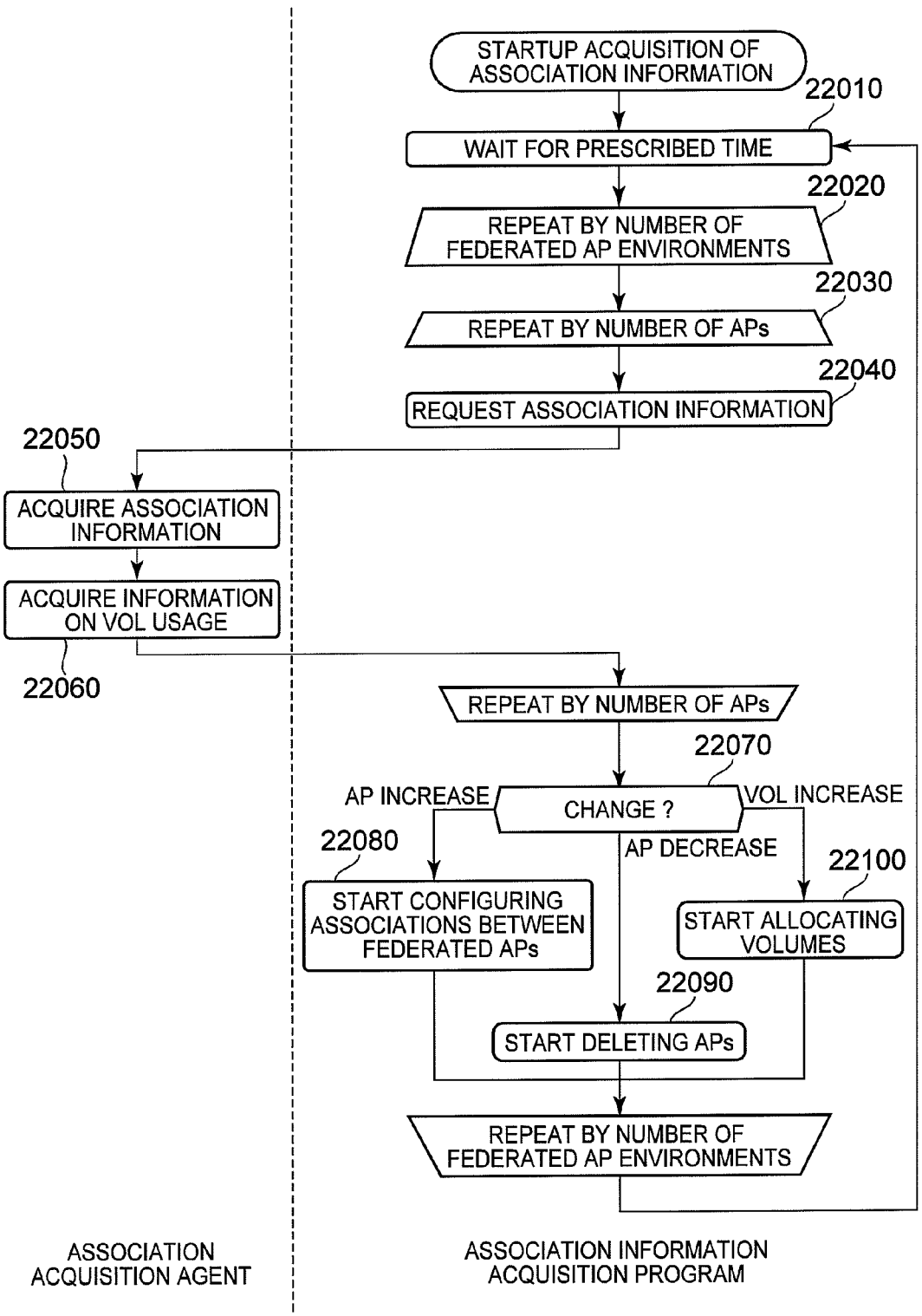
FIG. 22 is a flowchart showing the flow of processing executed by a association information acquisition program 19030.
Figure 23:
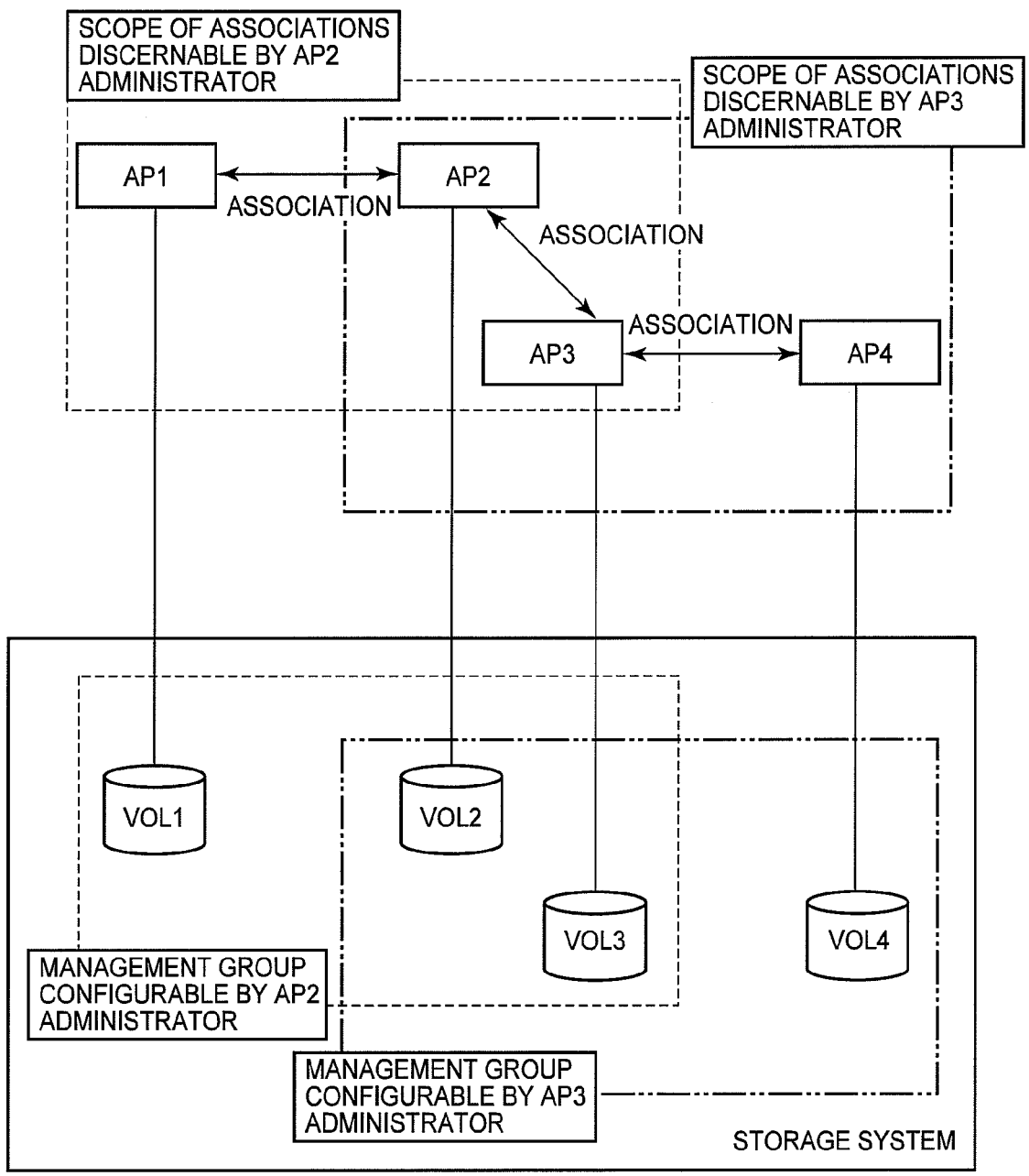
FIG. 23 is a diagram for illustrating the problems.

FIG. 22 is a flowchart showing the flow of processing executed by the association information acquisition program 19030.

This process is commenced by the administrator starting up the association information acquisition program 19030.

When this process commences, the association information acquisition program 19030 waits for a prescribed period of time (Step 22010).

Next, the association information acquisition program 19030 lists all the federated application environments from the federated AP environment management table 1252, and repeats the following processing in proportion to the number of federated application environments (Step 22020).

In the repeated processing for these federated application environments, the association information acquisition program 19030 lists the applications 1161 belonging to these federated application environments from the federated AP environment management table 1252, and repeats the processing of the following Steps 22040 through 22060 by the number of applications 1161 (Step 22030).

In the repeated processing for these applications 1161, the association information acquisition program 19030 uses the network addresses 20004 of these applications 1161 to request that the association acquisition agent 19010 of the host computer 1100 running these applications 1161 acquire association information (Step 22040).

The association acquisition agent 19010, which receives the request, acquires the identifiers of the applications 1161 to which the application 1161 in question is associated, and the network addresses thereof from the association management table 19020 (Step 22050). Further, the association acquisition agent 19010 acquires information listing the data volumes 2001 used by the application 1161 in question (Step 22060). Then, the association acquisition agent 19010 sends the association information acquired in Steps 22050 and 22060 to the association information acquisition program 19030. Furthermore, the list of data volumes 2001 is preconfigured by the administrator of the application 1161. For example, if it is a Linux (registered trademark) file system, /etc/fstab or the like is entered.

The association information acquisition program 19030 collects the association information of all the applications 1161 belonging to a federated application environment by repeating the processing of Steps 22040 through 22060 by the number of applications 1161.

Next, the association information acquisition program 19030 determines whether or not the association relationships of the applications 1161 shown in the collected association information coincide with those shown in the federated AP environment management table 1252' and AP/VOL correspondence table 1253 managed by the host computer 1100 (Step 22070).

When the determination result of Step 22070 is that the associated applications 1161 have increased, the association information acquisition program 19030 configures the association between the federated application environments. This processing is the same as that explained using FIG. 13.

When the determination result of Step 22070 is that the associated applications 1161 have decreased, the association information acquisition program 19030 deletes the applications 1161 from the federated application environments. This processing is the same as that explained using FIG. 15.

When the determination result of Step 22070 is that the data volumes 2001 of the applications 1161 have increased, the association information acquisition program 19030 carries out processing for adding data volumes 2001. This processing is the same as that explained using FIG. 14 (However, the augmented data volume 2001 is added without allocating a new data volume 2001.).

The association information acquisition program 19030 repeats the above processing by the number of federated application environments. When the repetitions are over, this process moves to Step 22010.

The preceding is an explanation of the flow of processing executed by the association information acquisition program 19030.

The above is an explanation of the third embodiment. According to this embodiment, the management computer 1200 is capable of discerning the overall configuration of a federated application environment by collecting information on applications 1161 to which an application 1161 is directly associated.

A number of preferred embodiments of the present invention have been explained hereinabove, but these embodiments are merely examples for explaining the present invention, and do not purport to limit the scope of the present invention to these embodiments alone. The present invention can be put into practice in a variety of other modes. For example, in addition to the configuration of a management group, the configuration program 1251 can send an update indication to the storage system 1000 to specify other types of information (for example, a protection period) corresponding to this management group. In this case, the control program 1028 of the storage system 1000 can make the specified other type of information (for example, protection period) correspondent to this management group by updating the management information group 1029 in response to this update indication.

What is claimed is:

1. A computer system, comprising:
 a storage unit which stores:
  application management information indicating respective applications included in each federated application environment of a plurality of federated application environments existing in the computer system, where the respective applications are determined constituents of said each federated application environment due to the respective applications effecting a plurality of associatively operated applications; and
  backup policy management information indicating, for said each federated application environment of the plurality of federated application environments, both: a volume group corresponding to said each federated application environment; and a backup policy denoting a type of backup function to be carried out in the volume group, where the backup policy is selectable from a plurality of different types of backup functions; and
 a configuration unit, which determines a specified plurality of applications constituting a specified federated application environment by referencing to the application management information, and which sends an indication for assigning to a same volume group, a plurality of first logical volumes allocated to the specified plurality of applications, and a plurality of second logical volumes constituting the backup targets for data stored in the plurality of first logical volumes, to one or more storage systems including at least one of: the plurality of first logical volumes and the plurality of second logical volumes; and
 a backup unit determining how data is to be backed up from the plurality of first logical volumes to the plurality of second logical volumes in a subject volume group, based on the backup policy indicated in the backup policy management information, for the subject volume.

2. The computer system according to claim 1, wherein the plurality of different types of backup functions each comprise a different function for backing up data from the plurality of first logical volumes residing in a plurality of first storage systems, to the plurality of second logical volumes residing in a plurality of second storage systems.

3. The computer system according to claim 1, wherein the configuration unit specifies, for a new application, the volume group and backup policy corresponding to the federated application environment from the backup policy management information when the new application is added as a component of the federated application environment, and on the basis of the specified backup policy, creates an indication for adding a first logical volume, which is to be allocated to the new application, and a second logical volume constituting the backup target for this first logical volume, to the specified volume group, and sends this indication to the one or more storage systems.

4. The computer system according to claim 1, wherein the configuration unit specifies, for a new first logical volume, the volume group and backup policy corresponding to the federated application environment from the backup policy management information when the new first logical volume is allocated to any of the applications constituting this federated application environment, and on the basis of the specified backup policy, creates an indication for both adding the new first logical volume, and a second logical volume constituting the backup target for this first logical volume, to the specified volume group, and sends this indication to the one or more storage systems.

5. The computer system according to claim 1, wherein, when an application is to be removed from the federated application environment, the configuration unit deletes information related to this application from information related to the respective applications corresponding to the federated application environment in the application management information, and sends to the one or more storage systems an indication for removing both the first logical volume allocated to this application to be removed, and the second logical volume which is the backup target for data stored in this first logical volume, from the volume group to which these first and second logical volumes belong.

6. The computer system according to claim 1, wherein:
there exists a first and a second federated application environment included in the plurality of federated application environments;
the storage unit also stores volume management information indicating which logical volumes reside in which storage systems; and
when the first federated application environment is associated to the second federated application environment, the configuration unit determines by referencing the volume management information whether or not a plurality of first logical volumes allocated to a plurality of applications constituting the first federated application environment, and a plurality of first logical volumes allocated to a plurality of applications constituting the second federated application environment, reside in one storage system, and if the determination result is negative, sends an indication for migrating a first logical volume residing in a storage system that is different from the one storage system to the one storage system, to at least one of the different storage system and the one storage system.

7. The computer system according to claim 1, further comprising an association information acquisition unit for acquiring association information indicating the relationship of which application is associated with an application, from a host computer which executes this application, and for using the acquired association information to update the application management information.

8. The computer system according to claim 7, wherein when the acquired association information indicates that a new application is associated to any of the applications constituting the federated application environment, the configuration unit specifies the volume group corresponding to this federated application environment, and sends to the one or more storage systems an indication for adding both a first logical volume allocated to the new application, and a second logical volume constituting the backup target for this first logical volume, to the specified volume group.

9. The computer system according to claim 7, wherein when the acquired association information indicates that a new first logical volume has been allocated to any of the applications constituting the federated application environment, the configuration unit specifies the volume group corresponding to this federated application environment, and sends to the one or more storage systems an indication for adding both the new first logical volume, and a second logical volume constituting the backup target for this first logical volume, to the specified volume group.

10. The computer system according to claim 1, wherein when the acquired association information indicates that an application, which has been associated to any of the applications of the federated application environment, becomes disassociated, the configuration unit deletes information related to this application from the information related to the respective applications corresponding to the federated application environment in the application management information, and sends to the one or more storage systems an indication for removing both a first logical volume allocated to this application to be removed, and a second logical volume, which is the backup target for data stored in this first logical volume, from the volume group to which these first and second logical volumes belong.

11. The computer system according to claim 1, wherein the application management information comprises compiled information including at least: a listing of the plurality of applications associated with each other in said each federated application environment; a listing of the first logical volumes allocated to the plurality of applications; a listing of the second logical volumes constituting the backup targets for data stored in the plurality of first logical volumes.

12. A processor-implemented backup environment configuration method, comprising:
storing:
application management information indicating respective applications included in each federated application environment of a plurality of federated application environments existing in the computer system, where the respective applications are determined constituents of said each federated application environment due to the respective applications effecting a plurality of associatively operated applications; and
backup policy management information indicating, for said each federated application environment of the plurality of federated application environments, both: a volume group corresponding to said each federated application environment; and a backup policy denoting a type of backup function to be carried out in the volume group, where the backup policy is selectable from a plurality of different types of backup functions; and determining a specified plurality of applications constituting a specified federated application environment by referencing to the application management information, and sending an indication for assigning to a same volume group, a plurality of first logical volumes allocated to the specified plurality of applications, and a plurality of second logical volumes constituting the backup targets for data stored in the plurality of first logical volumes, to one or more storage systems including at least one of: the plurality of first logical volumes and the plurality of second logical volumes; and determining how data is to be backed up from the plurality of first logical volumes to the plurality of second logical volumes in a subject volume group, based on the backup policy indicated in the backup policy management information, for the subject volume.

13. A non-transitory computer-readable storage medium embodying a computer program for causing a computer system to execute:

storing:

application management information indicating respective applications included in each federated application environment of a plurality of federated application environments existing in the computer system, where the respective applications are determined constituents of said each federated application environment due to the respective applications effecting a plurality of associatively operated applications; and backup policy management information indicating, for said each federated application environment of the plurality of federated application environments, both: a volume group corresponding to said each federated application environment; and a backup policy denoting a type of backup function to be carried out in the volume group, where the backup policy is selectable from a plurality of different types of backup functions; and determining a specified plurality of applications constituting a specified federated application environment by referencing to the application management information, and sending an indication for assigning to a same volume group, a plurality of first logical volumes allocated to the specified plurality of applications, and a plurality of second logical volumes constituting the backup targets for data stored in the plurality of first logical volumes, to one or more storage systems including at least one of: the plurality of first logical volumes and the plurality of second logical volumes; and determining how data is to be backed up from the plurality of first logical volumes to the plurality of second logical volumes in a subject volume group, based on the backup policy indicated in the backup policy management information, for the subject volume.

\* \* \* \* \*